US008027859B2

(12) United States Patent
Pulfer

(10) Patent No.: US 8,027,859 B2
(45) Date of Patent: Sep. 27, 2011

(54) ANALYSIS OF A MODEL OF A COMPLEX SYSTEM, BASED ON TWO MODELS OF THE SYSTEM, WHEREIN THE TWO MODELS REPRESENT THE SYSTEM WITH DIFFERENT DEGREES OF DETAIL

(76) Inventor: Roland Pulfer, Altendorf (CH)

( * ) Notice: Subject to any disclaimer, the term of this patent is extended or adjusted under 35 U.S.C. 154(b) by 1371 days.

(21) Appl. No.: 10/548,822

(22) PCT Filed: Mar. 18, 2004

(86) PCT No.: PCT/CH2004/000161
§ 371 (c)(1),
(2), (4) Date: Jul. 4, 2006

(87) PCT Pub. No.: WO2004/084103
PCT Pub. Date: Sep. 30, 2004

(65) Prior Publication Data
US 2006/0265257 A1    Nov. 23, 2006

(30) Foreign Application Priority Data

Mar. 19, 2003 (CH) ......................................... 449/03

(51) Int. Cl.
*G06Q 10/00* (2006.01)
(52) U.S. Cl. .......... 705/7.22; 705/7.11; 700/31; 700/52; 700/97
(58) Field of Classification Search .................. None
See application file for complete search history.

(56) References Cited

U.S. PATENT DOCUMENTS
4,849,879 A    7/1989    Chinnaswamy
(Continued)

FOREIGN PATENT DOCUMENTS
EP    0658260    6/1995
(Continued)

OTHER PUBLICATIONS

Fawzy Soliman, & Mohamed Youssef. (2001). The impact of some recent developments in e-business on the management of next generation manufacturing. International Journal of Operations & Production Management, 21(5/6), 538-564.*
(Continued)

*Primary Examiner* — Romain Jeanty
*Assistant Examiner* — Gurkanwaljit Singh
(74) *Attorney, Agent, or Firm* — Oppedahl Patent Law Firm LLC

(57) ABSTRACT

Disclosed is a method for analyzing a computer-based data processing model of a complex system, said model comprising at least two modeling levels on which the system is represented at different degrees of abstraction. The inventive method comprises the following steps: a first partial model of the system is created on a first modeling level by defining objects and links between said objects; a second partial model of the system is created on a second modeling level by defining objects and links between said objects; associations or relations between objects of the first and the second modeling level are created; at least one first chain of events is created which represents a sequence of actions on the first modeling level and describes said sequence of actions by means of the objects of the first modeling level; at least one second chain of events is created which represents the same sequence of actions on the second modeling level and describes said sequence of actions by means of the objects of the second modeling level; and at least one of the following two steps: the partial models and associations and chains of events created according to the previous steps are automatically analyzed in order to determine and output quality-related data about the model; the partial models and associations and chains of events created according to the previous steps are automatically analyzed in order to obtain data about the modeled system and output said data.

22 Claims, 16 Drawing Sheets

U.S. PATENT DOCUMENTS

| | | | |
|---|---|---|---|
| 5,249,300 A | 9/1993 | Bachman et al. | |
| 5,521,814 A | 5/1996 | Teran et al. | |
| 5,552,984 A | 9/1996 | Crandall et al. | |
| 5,799,193 A | 8/1998 | Sherman et al. | |
| 5,832,532 A | 11/1998 | Kennedy et al. | |
| 5,890,133 A | 3/1999 | Ernst | |
| 5,980,096 A | 11/1999 | Thalhammer-Reyero | |
| 6,278,977 B1 | 8/2001 | Agrawal et al. | |
| 6,385,610 B1 | 5/2002 | Deffler et al. | |
| 6,601,023 B1 | 7/2003 | Deffler et al. | |
| 6,763,353 B2* | 7/2004 | Li et al. | 1/1 |
| 6,865,582 B2 | 3/2005 | Obradovic | |
| 6,983,227 B1 | 1/2006 | Thalhammer-Reyero | |
| 7,007,029 B1* | 2/2006 | Chen | 1/1 |
| 7,137,057 B2 | 11/2006 | Williams | |
| 7,295,957 B2 | 11/2007 | Pulfer | |
| 7,418,409 B1* | 8/2008 | Goel | 705/26 |
| 7,433,743 B2* | 10/2008 | Pistikopoulos et al. | 700/52 |
| 7,457,674 B2* | 11/2008 | Yuan et al. | 700/31 |
| 7,472,080 B2* | 12/2008 | Goel | 705/26 |
| 7,620,639 B2 | 11/2009 | Pulfer | |
| 7,730,019 B1 | 6/2010 | Graham | |
| 7,752,144 B1* | 7/2010 | Myers et al. | 705/400 |
| 2002/0133368 A1* | 9/2002 | Strutt et al. | 705/1 |
| 2002/0169785 A1 | 11/2002 | Netemeyer et al. | |
| 2003/0028451 A1* | 2/2003 | Ananian | 705/27 |
| 2003/0046130 A1* | 3/2003 | Golightly et al. | 705/7 |
| 2003/0115129 A1* | 6/2003 | Feaver et al. | 705/37 |
| 2003/0177047 A1 | 9/2003 | Buckley | |
| 2003/0220860 A1* | 11/2003 | Heytens et al. | 705/35 |
| 2004/0006567 A1 | 1/2004 | Kurtz et al. | |
| 2004/0162741 A1* | 8/2004 | Flaxer et al. | 705/7 |
| 2005/0065626 A1* | 3/2005 | Kappelhoff et al. | 700/97 |
| 2006/0085241 A1* | 4/2006 | Chelniak et al. | 705/8 |
| 2006/0277022 A1 | 12/2006 | Pulfer | |
| 2010/0036874 A1 | 2/2010 | Pulfer | |

FOREIGN PATENT DOCUMENTS

| | | |
|---|---|---|
| EP | 0 895 169 | 6/1998 |
| EP | 1 065 617 | 1/2001 |
| WO | WO 94/06087 | 3/1994 |
| WO | WO9748063 | 12/1997 |

OTHER PUBLICATIONS

Ding, Tao (2002). Application of stochastic models in scrap processing problem under JIT. M.Sc. dissertation, University of Alberta (Canada), Canada.*

Anussornnitisarn, Pornthep (2003). Design of active middleware protocols for coordination of distributed resources. Ph.D. dissertation, Purdue University, United States—Indiana.*

Modeling the Supply Chain Santosh Kumar Mahapatra. Journal of Business Logistics. Oak Brook: 2003. vol. 24, Iss. 1; p. 244.*

Ramakrishnan, S., & Wysk, R.. (Jan. 1). A Real-time Simulation-Based Control Architecture for Supply Chain Interactions. IIE Annual Conference. Proceedings,1-6.*

Frank Dewhurst, Kevin Barber, & J J B Rogers. (2001). Towards integrated manufacturing planning with common tool and information sets. International Journal of Operations & Production Management, 21(11), 1460-1482.*

Dotun Adebanjo. (2003). Classifying and selecting e-CRM applications: An analysis-based proposal. Management Decision, 41(5/6), 570-577.*

Vassiliadis, P.; , "Modeling multidimensional databases, cubes and cube operations," Scientific and Statistical Database Management, 1998. Proceedings. Tenth International Conference on , vol., No., pp. 53-62, Jul. 1-3, 1998.*

V Ha, P Haddawy "Problem-Focused Incremental Elicitation of Multi-Attribute Utility Models" In: Proceedings of the thirteenth Conference on Uncertainty in Artificial Intelligence, (Aug. 1997) pp. 215-222.*

International search report for international application No. PCT/CH04/00161.

Written opinion for international application No. PCT/CH04/00161.

Bradley et al., Business process re-engineering (BPR)—A study of the software tools currently available, 1995.

Cai et al., Transaction level modeling: an overview, U.S., Oct. 1, 2003.

Cobena et al., Detecting changes in XML documents, Proceedings of the 18th International Conference on Data Engineering, 2002.

Georgakopoulos et al., An overview of workflow management: from process modeling to workflow automation infrastructure, Distributed and Parallel Databases, Kluwer, NL, vol. 3, No. 2, Apr. 1995, p. 119-153.

International Search Report for PCT/CH04/00162, Pub. # WO 2004/083983 (this app. entered the US National Stage and issued as US Patent 7,620,639 on Nov. 17, 2009), Feb. 2006.

International Search Report (ISR) of International Searching Authority (ISA) for application PCT/CH02/00516, pub # WO 2003/027916, Mar. 2003.

English Translation of the Written Opinion of the International Search Authority for PCT/CH04/00162, Pub. # WO 2004/083983 (this app. entered the US National Stage and issued as US Patent 7,620,639 on Nov. 17, 2009), the search published Sep. 2005, the English translation published Feb. 2006.

* cited by examiner

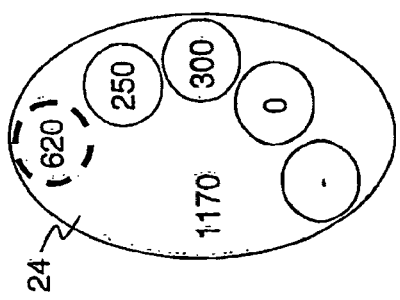
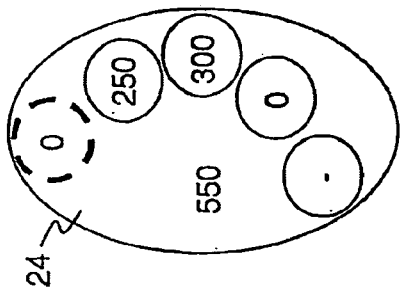
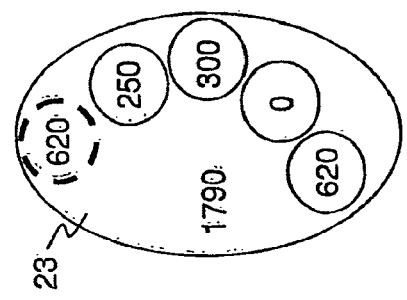
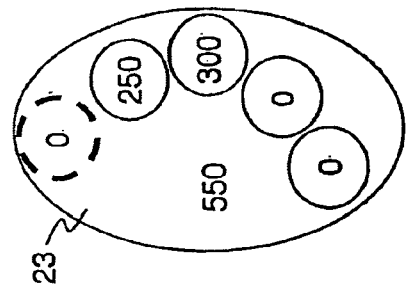
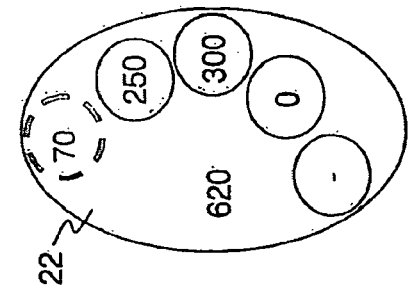
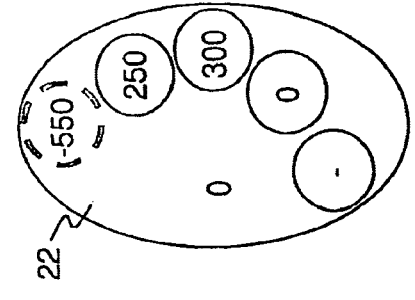
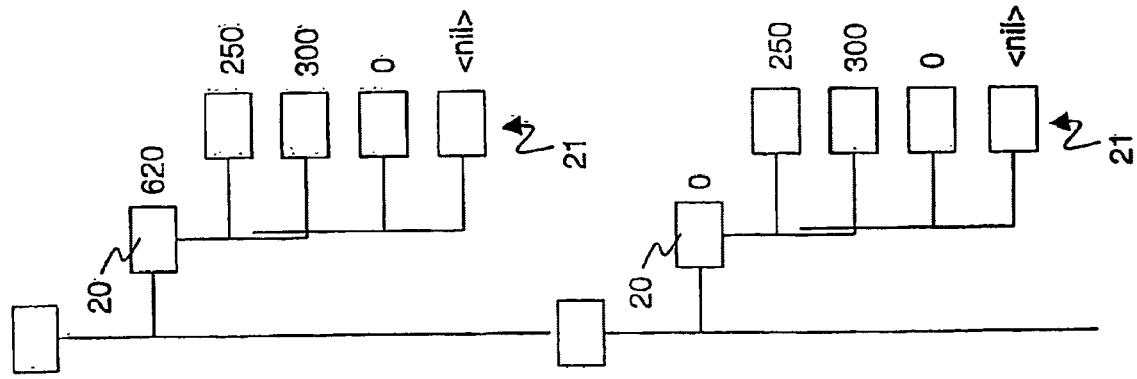
Fig. 15a
Fig. 15b

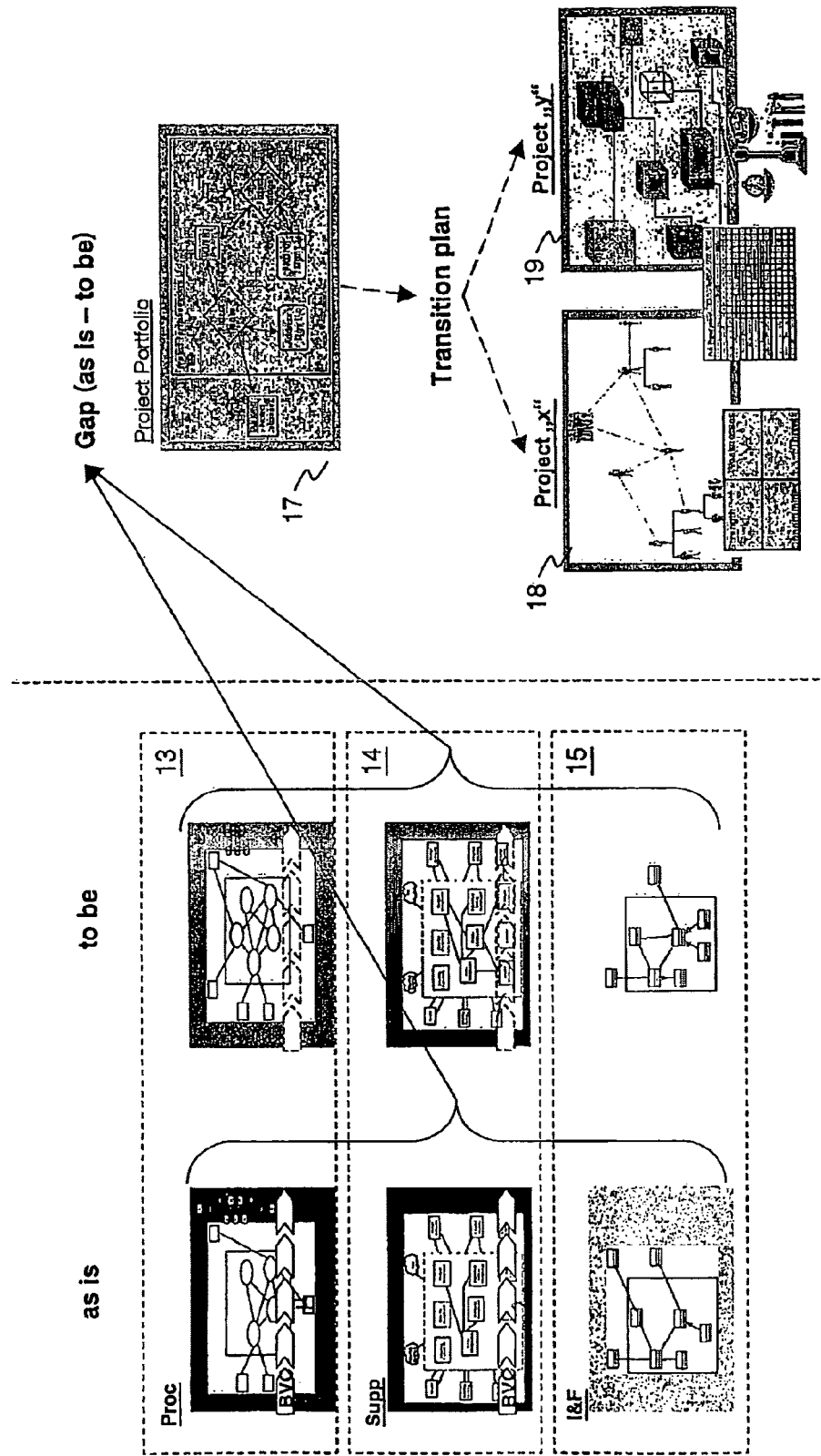

ANALYSIS OF A MODEL OF A COMPLEX SYSTEM, BASED ON TWO MODELS OF THE SYSTEM, WHEREIN THE TWO MODELS REPRESENT THE SYSTEM WITH DIFFERENT DEGREES OF DETAIL

The invention relates to the modelling of complex systems. A system of any type, for example an installation relating to process technology or manufacturing technology comprises a multitude of interacting and mutually dependent units, which due to their cooperation, produce a desired result, for example a physical product. The same also applies to a system which also or chiefly comprises human actuators or handlers and produces a physical product and/or a service. The invention is furthermore directed to the field of data acquisition, data organisation, data evaluation and the use of data processed in such a manner, for the control and monitoring of complex systems. A related application is PCT/CH02/00516, whose content is herewith incorporated in its entirety here.

With complex systems which have a multitude of processes which are linked to one another, it is very difficult to predict the influence of changes of individual links and parameters on a behaviour of the complete system. For example, with the manufacture of highly complex products with corresponding processing sequences and likewise a corresponding organisation, the implementation of goals, the monitoring of the execution and the decision-making and control represent a large problem. Since the number of influencing variables increases with the size of a manufacturing process, of a company or of a project in an exponential manner, one may not have an overview of these with regard to their entirety. For this reason it is not easy to distinguish relevant from non-relevant variables, i.e. parameters and readings, to weight them and to evaluate and/or use them in the correct context. Decisions with the control of technical and organisational process are therefore often made in an arbitrary manner.

The reproduction of such processes as a rule is effected with specialised modelling or administration programs for ERP (enterprise resource planning), CRM (customer relation management), SCM (supply chain management), etc., and with tailor-made production control software.

There arises the problem of correctness and interpretation or analysis of the models.

It is therefore an object of the invention to provide a method, a data-processing system and a computer program for the analysis of a model of a complex system, which permit an adequate representation of the system and an assessment of the model quality. A further object of the invention is to provide a possibility of the analysis of the system on account of the model, which provides essential characteristic values for assessment of the system with a limited effort.

This object is achieved by the subject-matter of the independent claims. The dependent claims relate to advantageous formations of the invention.

With the analysis of a model of a complex system, wherein the model comprises at least two modelling levels on which the system is represented with different abstraction grades, thus the following steps are carried out:
  creation of a first model of the system on a first modelling level by definition of objects and links between these objects;
  creation of a second model of the system on a second modelling level by definition of objects and links between these objects;
  creations of associations or relations between objects of the first and of the second modelling level;
  creation of at least a first event chain, which represents a sequence of action in the first modelling level and describes by way of the objects of the first modelling level;
  creation of at least one second event chain, which represents the same sequence of action in the second modelling level and describes the action sequence by way of the objects of the second modelling level;
  as well as at least one of the following two steps:
    automatic analysis of the part models and associations and event chains created according to the preceding steps, for determining and for issuing information on the quality of the model itself,
    automatic analysis of the part models and associations and event chains created according to the preceding steps, for obtaining information on the modelled system and for issuing this information.

Thus various aspects of a system or its processes and event chains are modelled on at least two observation levels, and relations between the objects used for this are modelled. The creation of the models, associations, etc. may be effected manually and/or automatically. A control of the quality of the model is made possible by way of this type of modelling, that is to say by way of a linking-up of various model elements. For example, one may test as to whether the model is not only syntactically correct, but is also complete and consistent over the various observation levels.

Results of the analyses are issued to the user by way of a print-out or display apparatus. Preferably the model is adapted in an iterative manner on account of the issued data, i.e. is corrected and/or tracked to the reality of the modelled system.

The invention has the advantage that information which describes the system is brought into relation to one another in the model. On account of redundancies and of properties of a structure of these interrelations, one may ascertain as to whether the information may be correct. Otherwise inconsistencies, contradictions, incompleteness etc. may be ascertained. The model may be corrected by way of this and a quality of the model is increased. By way of the intense linking which indeed is an image of the real system, effects and dependencies may be recognised and evaluated in an improved and simpler manner.

The various modelling levels, relations and event chains are based on different observation manners of a technical and/or organisatory system. Usually these manners of observation, if indeed they are applied in a conscious manner at all, are only used individually or isolated from one another, so that no mutual control and validation is possible.

A few further terms are defined for an improved understanding of the invention:

A system consists of a quantity of interacting units whose behaviour as a whole is to be modelled, examined and modified and preferably also monitored. Preferably a system is a technical installation, a machine, a production process or a working process, wherein a system may also contain several of these aspects.

The interacting units are preferably electromechanical, method/processing technological and/or information-processing or information-carrying subsystems or elements, or also organisatory subunits and locations of an organisation. As a unit one may for example consider: a machine as part of an installation, a processor as part of a machine, an autonomous manufacturing cell, a product or product component, a computer installation, a data bank, a software object, a machine-readable file, a department of a company, a person, a function or role in an organisation, etc.

The term modelling relates to the first-time formation of an abstract, in particular machine-readable representation of the system, as well as a tracking of this representation to an actual, real condition of the system. The latter in particular is used with an online process analysis ("monitoring") and/or with a control of the system by way of control commands determined in the model. This representation of the system is also called model, and comprises a model structure as well as model parameters. The model structure represents relations between modelled units, whilst the model parameters are numeric and/or textual characterisations of properties of the units or relations. The model comprises mechanisms and rules for linking and processing data which represent the aspects of the system. The model is thus not only a model containing data, but also one which processes data.

The modelling is thus effected on a lowermost description level with a limited set of basic types for the representation of the units and for the description of their interaction. The basic types have inputs and outputs for receiving and for the transfer of data. The basic types are:

- a basic type "transfer" (straight), which represents a transfer of units, leads through data for characterisation of these units and comprises one input as well as one output,
- a basic type "merge", which represents a combining of units, links data for the characterisation of these units to one another, and comprises two inputs as well as one output for the linked data,
- a basic type "split", which represents a dividing-up of units, determines data for characterisation which originate from a dividing-up, from the data of a unit to be divided up, and comprises one input as well as two outputs.

The invention has the advantage that all procedures between the units at each detailing and observation step may be traced back to these basic types. The modelling effort is reduced, may be schematised and at least partly automated by way of this. A further advantage is the fact that also different analyses of the model may be standardised and automated in a comparatively simple manner, since it is always the same basic types which must be processed, which simplifies a formalisation and programming of the analysis. By way of the fact that it is always the same basic types which are used for system definition, the comparison possibilities between systems are increased. This is independent of whether a comparison is effected automatically or manually, and whether type-related and non-type-related systems are compared. A transparency of the models is increased even with a higher complexity.

The use of basic types in its concept corresponds to a use of switch elements in electronics technology: with a limited set of switch elements such as transistors, resistances, inductances and capacitors one may create an immense variety of circuits. This is similar to the logic of integrated circuits where all conceivable logic logical links may be realised only by way of NAND gates.

The basic types are expressed preferably in a class hierarchy of an object-orientated representation of software objects from which the model is built up. Thus all other essential software objects are defined by way of these basic types, and furthermore of course have further attributes and methods.

In a preferred variant of the invention, based on the basic type "transfer", two further basic types are defined and used:

- a basic type "store", which represents a storing of units, stores data for the characterisation of these units and comprises one input as well one output.
- A basic type "source", which represents a source of units, produces data for the characterisation of this units and comprises one output.

In a preferred variant of the invention, each basic type has a history function or protocol function with which it stores processed or led-through data as well as the point in time of the processing or leading-through. With this, it becomes possible to set up statistics and analyses as well as a later follow-up of procedures.

In a further preferred variant of the invention, the basic types are summarised into so-called objects on a higher hierarchy step. Of the inputs and outputs of the summarised basic types, a number remain within the object, thus is not visible outside the object. Other inputs and outputs become visible to the outside as inputs and outputs or interfaces of the object. As a rule, an object comprises one or more inputs and one or more outputs. An object may however comprise no inputs or no outputs when it is at the beginning or at the end of an event chain respectively. The term "object", as is used in this application is more restrictive than the term "software-object within the context of the object-orientated programming". Objects as well as basic types are software objects. Objects consist of a quantity of basic types and have defined properties and behaviour at their disposal. Objects are later also called "predefined objects", but for the sake of brevity as a rule are only called objects.

This permits a structured and systematic model formation and also the association of information and properties with an object as a whole. Furthermore a recycling of commonly occurring structures of basic types as predefined objects is possible, which in turn renders an efficient model formation possible.

Objects preferably have different forms, which is to say that they represent different aspects of reality. According to generally known principles of object-orientated programming, objects are defined for representing for example products, sequences (procedures), action carriers, production means etc., which inherit properties and methods of a general object and add specific properties and methods to these. All objects however comprise at least one of the five basic types.

A few further additional definitions are required for a further explanation of the invention. The system and its behaviour are observed on three observation levels called "process level", "element level" and "information and function level".

The process level comprises processes. The system is considered as a grouping of processes. With this, a process is an entirety of tasks, sequences and decisions. Processes for example are production processes or working processes such as "manufacture", "end assembly", "energy production", "print machine line", "acetylene synthesis", "store administration", "procurement", "personnel administration", etc. A process, from other object types, for example other processes or external agents (see below), via its inputs obtains entries or input, and produces issuings or outputs for other object types. A process may be divided into sub processes.

A certain task of a process is solved by a certain sequence of activities and a suitable flow of information. This course is called an event chain. Event chains are for example "manufacture Airbus A320", "manufacture 50 tonnes of sulphuric acid", "make part XY available from the shelf store system", "configure print machine", "set up computer workplace", "employ workers". The term process thus describes a unit which is in the position of fulfilling certain tasks, whilst the term event chain describes a certain sequence (procedure) in a process or over several processes. Several event chains typically use a process.

For modelling sequences (procedures), one preferably uses activity diagrams which on an upper representation level represent known flow diagrams. An activity diagram describes activities which take their course sequentially and/or in a branched manner. Individual activities, branching points and decision points of an activity diagram are objects and are thus built up of the basic types. For example a basic type "split" with corresponding inner rules represents a branching point. An activity may be constructed from a quantity of infinitely connected basic types or of a separate activities diagram. A sequence (procedure) within a process thus on the one hand may be modelled by basic types and on the other hand also by way of activities which in turn consist of basic types.

External agents are model parts which represent one aspect of reality which seen in the model or by part of the model is not modelled in a detailed manner, or an aggregation of objects consisting of basic types. An external agent essentially provides an interface, that is to say inputs and outputs, and optionally comprises a simplified modelling of an internal behaviour which per se is more complex, but whose details are of no interest.

The element level comprises elements. An element represents a real physical unit from the categories of information technology (IT), organization, tools and mechanical-electronic modules. An element supports a process or an activity of a process. Elements are for example computers, an IT-department, a person or a function carrier, a processing machine, an electromechanical product or its individual parts.

The information and function level comprises information and functions. These in particular represent information-technological units such as data bank tables or data bank attributes, variables or their values, as well as procedures, programs, readings and parameters.

The five basic types may be applied on each of the observation levels. The system is thus modelled on each of the observation levels with the same basic types, wherein the units whose representation is represented or processed by way of the basic types, are of a different type, depending on the observation level. Usefully also objects and predefined objects are used on all observation levels In order to represent relations between basic types, objects and amongst one another, preferably differently natured relation types are used. For the sake of simplicity, in the following only objects are mentioned, wherein basic types, as the simplest forms of objects, are also meant. These relation types are grouped as permanent relations, interactive relations, flow relations and difference relations.

Permanent relations represent a simple reference of one object to another, or the fact that an object in another observation level corresponds to another object. For example a process "store administration" represents a quantity of several activities "dislocating", "place in stock", "create inventory", etc. This is represented by a quantity of accordingly permanent relations between the process and the individual activities.

Interactive relations or interactions represent an influence of one object on another. With this, the type of influence or interaction at the point in time of model formation is known and is represented by the type of interactive relation. For example, a system rejection rate of product components may be determined by rejection rates of product components, wherein dependencies of the system failure on failure of individual components are represented by respective interactive relations. In another example, for an event chain "manufacture motor", by way of two interactive relations one sets that for this, on the element level in a certain space of time, a machine tool is used to a 70% capacity and a certain manufacturing cell to a 50% capacity. Again, in another example the interactive relation expresses the fact that a certain characteristic value which for example represents a risk, a degree of accomplishment, costs, time expense, material consumption, energy consumption etc. is transferred from a first object to a second object. In the second object, the value is computed with values of other objects, and a characteristic value for the second object is computed. In a further example, an interactive relation represents the fact that a first object sends an event message to a second object under certain conditions, and this message, as the case may be, activates changes or computations in the second object.

Flow relations represent a transfer of information or contents of one object to a second object. With this however, in contrast to an interactive relation, the type of the influence on the second object which possibly results from this is not known at the point in time of model formation. For example, a file is transmitted according to a flow relation, and this file is analysed in the second object according to predefined rules or algorithms and, as the case may be, leads to certain activities of the second object. In another example, an event or a command is transmitted according to a flow relation, wherein the processing of the event and any reaction is determined by the receiving object.

Difference relations represent differences between similar type objects which find themselves in a different condition. A difference relation encompasses all these differences and with this may be very extensive, according to the complexity of the objects.

In a preferred variant of the invention, by way of such relations, one determines as to how much the resources are used to capacity and/or to which extent a predefined target of a system (goal) has been achieved. For example an event chain on the process level consists of individual steps and process steps. Each individual step is supported by one or more elements from the element level, which is modelled by way of corresponding relations between processes and elements. Preferably such supporting relations are associated with one or more numerical values, which for example express how much a certain element supports a certain process. By way of this type of modelling, on the one hand one may determine that an adequate support for one or more certain event chains exists, and one the other hand one may determine a utilisation of the supporting elements.

In a further preferred variant of the invention, two models of the same system are used. One model represents the system in a first, for example actual condition, the other model represents the system in a second, preferably nominal condition. Differences between the two conditions are evaluated by way of an automatic comparison algorithm, and actions are determined which convey the system in steps from the first into the second condition.

The model or parts of the model are either produced manually or automatically. For the manual production one preferably uses a graphic editor. With this for example, objects and relations are represented on display means such as a screen as areas or connection lines, and with the help of a display means such as a computer mouse are positioned and connected to one another. Parameters of objects or relations are for example represented and changed via associated representation and input masks. A suitable text is inputted for changing a parameter, or a list or a dialog for definition of the parameter in accordance with already inputted model elements appears on clicking on an assigned screen element.

For the automatic production of model parts, preferably program units are applied into an existing data processing system which automatically detects, and analyses automatic units such as processing units, data flows and request structures of the data processing system, and in the model produce corresponding objects and relations for imaging these units.

In a further preferred variant of the invention, for a model whose structure is known, parameters are automatically determined by way of program units distributed in a data processing system and are stored as part of the model.

In a further embodiment of the invention it permits the analysis, monitoring and control of a real system. For this, readings from the system are conveyed automatically or manually to the model, and the model is updated and analysed according to different methods. On account of the use of uniform basic types and relation types, these methods, for example an automatic comparison of various models of the same system, may be applied to different system levels and in various interrelations. Further methods for example determine risks, quality, performance, stability or the robustness of a system and their interrelations. This is effected continuously through the complete model thanks to the modelling by basic types based on everything. This also applies to a modelling and analysis by way of predefined objects which are based on the basic types. The presence of rules and exceptions in the basic types permits a highly flexible monitoring of the system since control conditions and/or control methods may be linked to each object and to each relation.

Amongst other things, the invention has the advantage that a system structure may be represented in a comprehensive manner and important parameters of a system may be detected in an objective manner. With traditional concepts, the complexity of the system on account of [inter]linking and constant changes leads to the fact that such parameters are estimated and interpreted differently. A standardised detection of basic factors of the system or process, their qualification and evaluation is thus not possible in practise, or entails a very great expense with regard to time and use of resources. The invention permits—under certain circumstances—and automatic detection of a multitude of measurements and their evaluation in the context of a model which images the relevant aspects of the reality in a useful manner. Units, sequences and procedures in the observed system are imaged with their parameters and set into relation with one another, and then analysed according to the interlinking. Models with a high quality result by way of the use of standardised sequences and algorithms on model formation and their verification by way of comparison of different model aspects. The real system may be controlled and/or the model may be tracked to the real system as a result of the evaluation.

The invention is particularly suitable for the modelling of complex, multidimensional interlinked systems. These real existing system properties by way of the various predefined objects such as observation levels and segments, event chains, processes, product, etc. may be detected/acquired and may be brought into relation with one another. The expressive capability of the modelling with a simultaneously unified basis permits a comprehensive representation of the system in the model, which may be applied to various automatic analysis methods.

The invention is preferably implemented in the form of one or more computer programs.

The data processing system according to the invention comprises storage means with computer program code means stored therein which describe a computer program, and data processing means for executing the computer program, wherein the execution of the computer program leads to the implementation of the method according to the invention.

The computer program according to the invention may be loaded into an internal memory of a digital data processing unit and comprises computer programming code means which when they are carried out in a digital data processing unit, cause this unit to carry out the method according to the invention. In a preferred embodiment of the invention, a computer program product comprises a computer-readable medium on which the computer program code means are stored.

In a preferred embodiment of the invention, separate parts of the computer program are carried out in separate computers, for example according to known client/server architecture and/or amid the use of data banks distributed over a network. A connection to information distribution systems such as e-mail, SMS (short message system) exists for alerting and informing operating personnel or users.

BRIEF DESCRIPTION OF THE DRAWINGS

The subject-matter of the invention is hereinafter explained in more detail by way of preferred embodiment examples which are represented in the accompanying drawings. Schematically, there are shown in:

FIG. 15 different cost distribution types;
and
FIG. 16 a model comparison.

Equal or the same types of parts are basically provided with the same reference numerals in the figures.

WAYS OF CARRYING OUT THE INVENTION

In the following, information used according to the invention and structures are described first, and subsequently the method which is built up from these.

A system consists of a quantity of interacting units whose behaviour as a whole is to be modelled, examined and modified. Preferably a system is a technical installation, a machine, a production process or a working process, wherein a system may also contain several of these aspects. A production process for examples serves for producing physical products or energy. A quantity of basic types serves as a basic "kit" for modelling.

Basic Types

Figure 1:
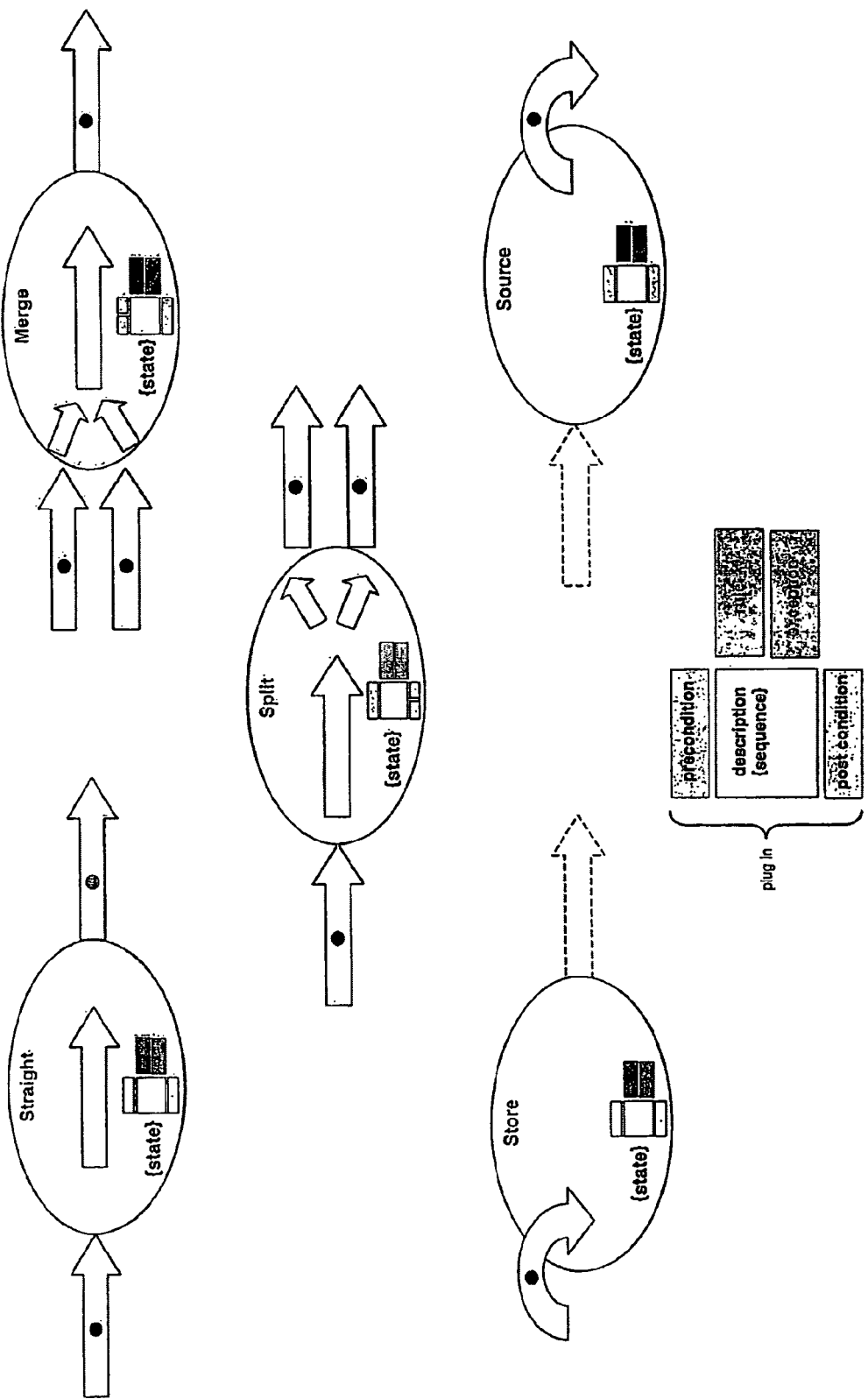
FIG. 1 basic types.

FIG. 1 schematically shows basic types which form a canon for the model formation for representing a system. The basic types are indicated:
1. "source", with no input and one output;
2. "transfer" (straight), with one input and one output;
3. "merge", with two inputs and one output;
4. "split", with one input and two outputs; and
5. "store", with one input and one output.

Basically the basic types "source" and "store" may be represented by the basic type "transfer", so that three basic types are sufficient for modelling. The two additional basic types are useful for a simpler representation.

The mentioned inputs and outputs represent the acceptance or handing-over of data respectively. In particular, an input and output may be a simple event or trigger, and/or carry a content. The inputs and outputs are linked to those of other basic types on construction of the model. One may form networks of an infinite type and complexity from the basic types on account of this. Basic types have a condition (such as "on", "in use", "deleted", "suspended", "sold", "processed", etc.), which may change, attributes, which define characteristics of a basic type, as well as Descriptions or functions which describe a sequential behaviour of the basic type as process-related sequence;

preconditions for describing a start situation which must be present so that the behaviour or description or function of the basic type may be triggered; and postconditions for describing an end situation which prevails after sequences of a corresponding behaviour or a description or function of the basic type.

During the sequence of a function, for example rules and mathematical operations which describe a behaviour are carried out, and conditions which correspond to predefined exceptions are treated in a special manner.

In the following manner a working process is described by way of example. An action regulation for a machine control for example is expressed in an analogous manner and is programmed in a suitable syntax.

Precondition: a notification arrives via telephone, fax, e-mail.

Descriptions:

10 all notifications are entered into a uniform form.

20 the notifications are registered.

30 the individual invitations are finished off.

40 the participant list is completed.

50 the invitations are prepared for dispatch.

Postconditions: e-mail invitations, paper invitations.

Rules: with regard to 20

If the notification concerns a member: attach a bill for Fr. 50 to the invitation.

If the invitation concerns a non-member: attach a bill for Fr. 250 to the invitation.

If the invitation concerns a VIP, attach no bill to the invitation.

Exception: with regard to 30

If the address is incomplete, an inquiry by telephone is carried out and the address is made complete.

The various basic types are characterised as follows:

The basic type source based on an event produces a certain content and makes this available at its output to another basic type. The basic type itself protocols its actions by way of a memory or protocol function. By way of this it is later known which content it has produced on account of which event and at which point in time. The event for activating an output or for producing a content does not necessarily need to come from the outside, but for example is generated by an internal time trigger.

The basic type transfer or straight makes available a content which it has obtained at the input with or without change at its output, to another basic type. The basic type itself always knows which content it has passed on and at which point in time.

The basic type merge unifies the contents which it has received at two inputs and produces a new content according to its rules. It provides these contents at its outputs to other basic types. The basic type itself always knows which contents it has merged and at which point in time.

The basic type split splits the content which it has received at the input and produces new contents according to its rules. It makes these contents available to other basic types at its outputs. The basic type itself always which contents it has split and at which point in time.

The basic type store stores the contents which it receives at the input and may at its output make a corresponding event available to other basic types. The event for example contains the information "a piece of information of type X was stored at the point in time Y" or only a counter "until now the information X was received a number of times Z". The basic type itself always knows which content it has stored and at which point in time.

Figure 7:
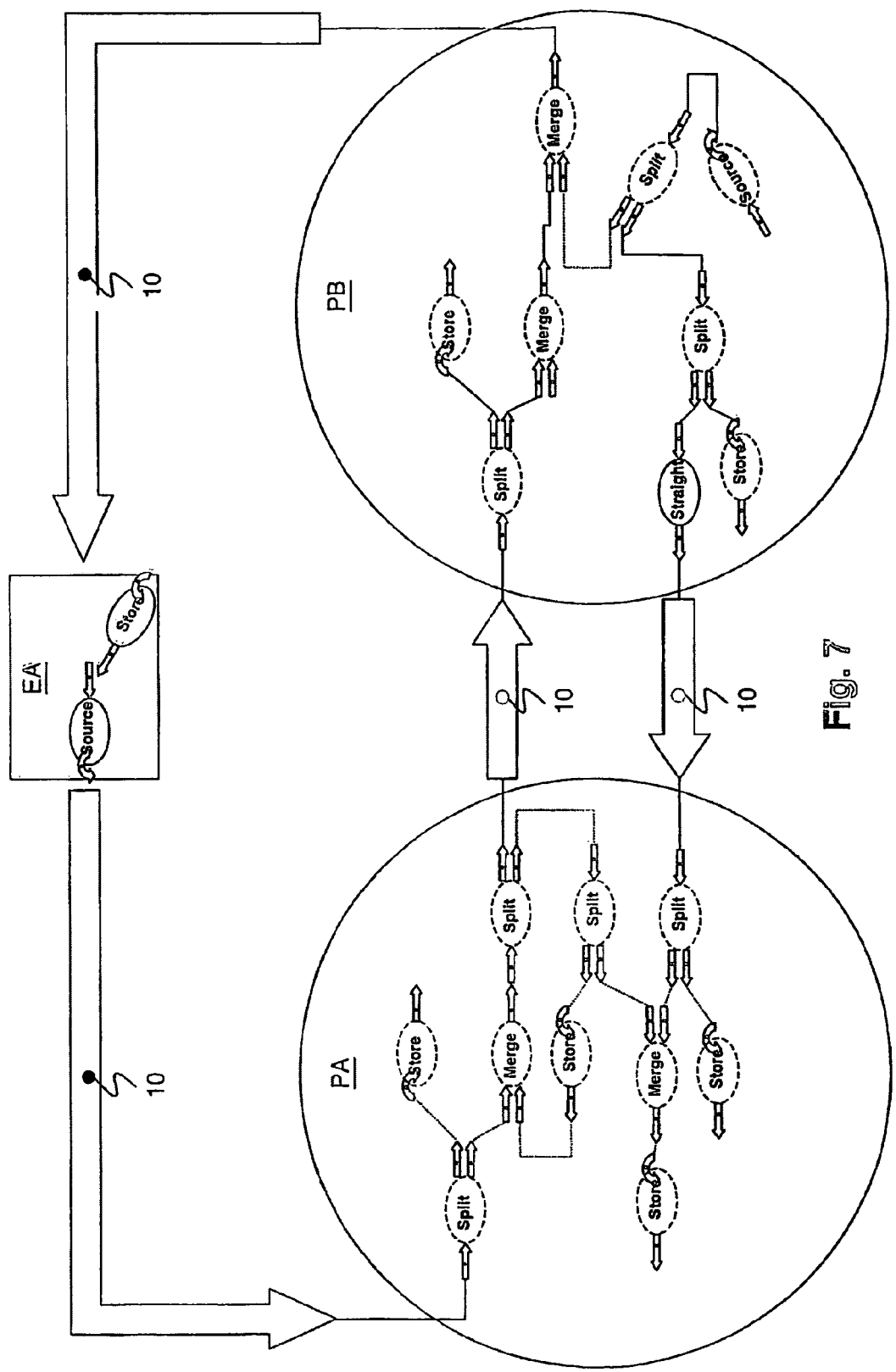
FIG. 7 a simple example with predefined objects "process" and "external representative"
Figure 9:
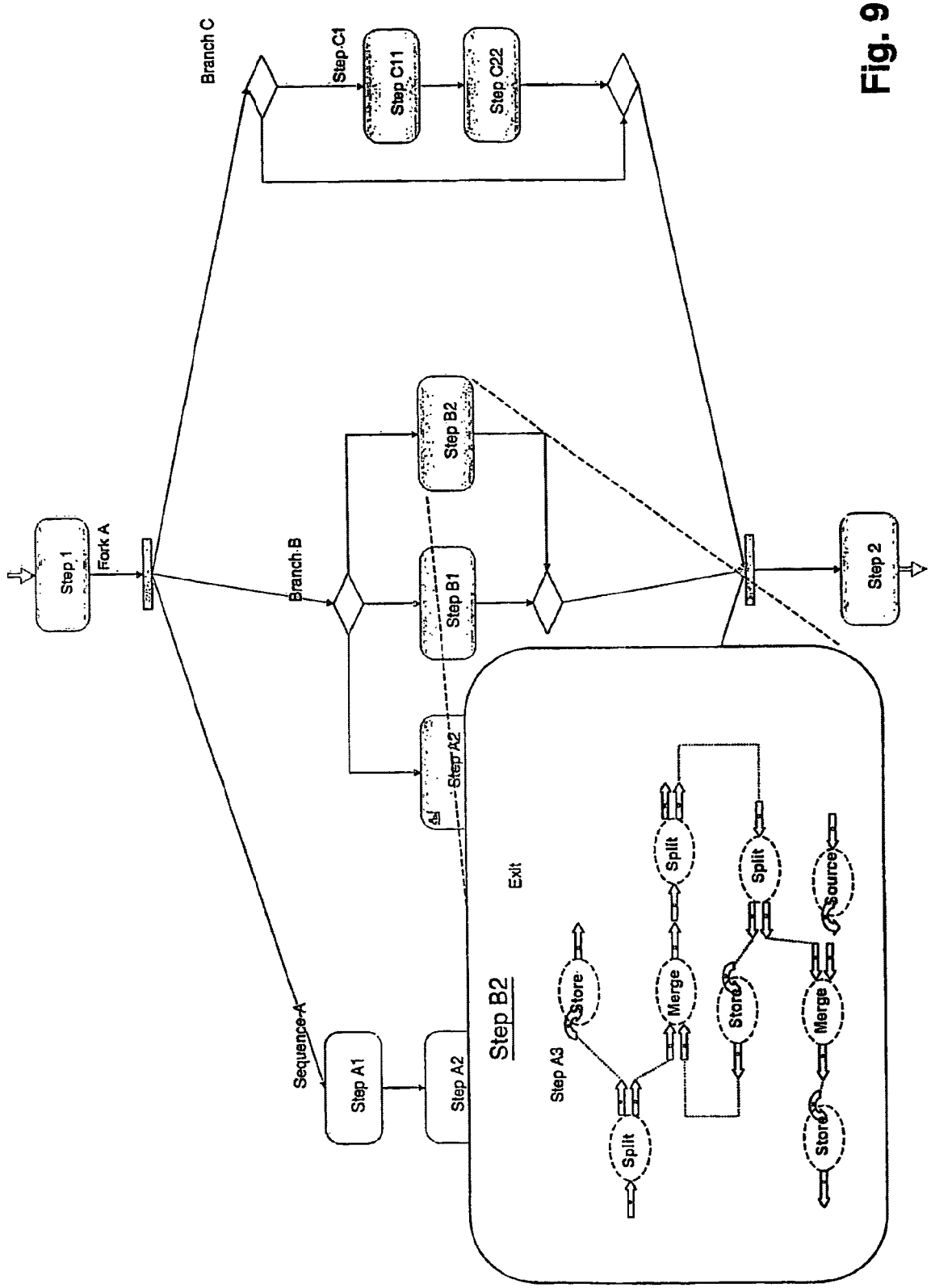
FIG. 9 a predefined object "activity" in an activity diagram.

A representation of processes is shown in FIG. 7, of activities in FIG. 9 and of event chains in FIG. 13 as an example of basic types, and is described further below.

Objects

For representing a more complex behaviour, several basic types are linked via their inputs and outputs and the quantity of these linked basic types are observed as a unit. Such a combination of basic types is called an object. Inputs and outputs of a sub-quantity of the basic types are also inputs and outputs respectively of the object, whilst other inputs and outputs remain within the object. Preferably the variety of such objects is limited in that a limited number of predefined objects with a fixed inner structure and accordingly limited, but instead of this, established behaviour is used, which in turn may be combined with one another.

Figure 2:
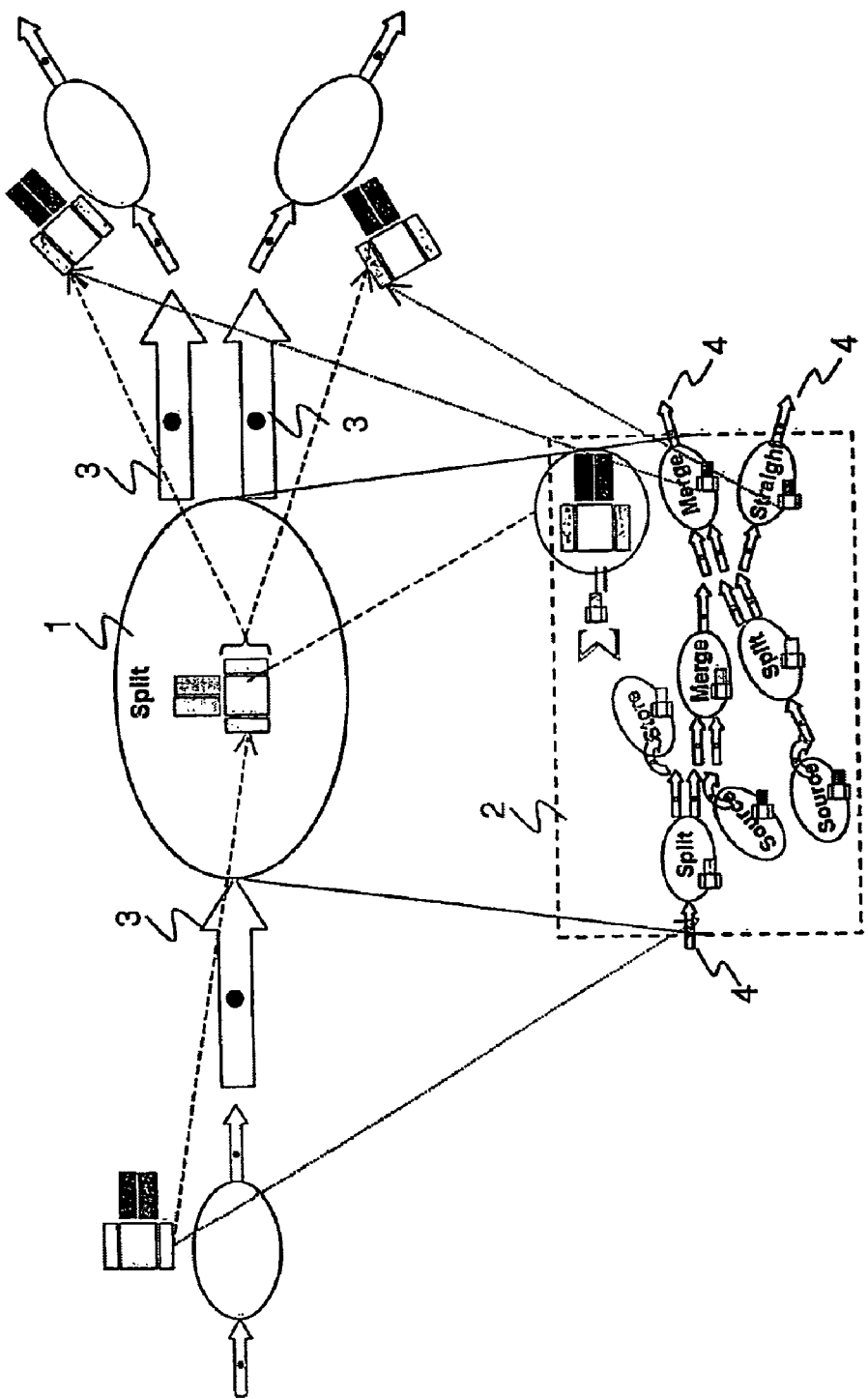
FIG. 2 a splitting of an object into basic types.

FIG. 2 shows a formation of the object 1 from a quantity 2 of several basic types. Suitable interfaces 4 of the basic types may be seen at interfaces 3 of the object, other interfaces of the basic types remain hidden in the object. Preconditions for the object are the same as the preconditions of those basic types whose input forms the input of the object. Postconditions for the two outputs of the object are equal to the postconditions of the corresponding basic types, whose outputs form the outputs of the object. Rules of the object are a logically derivable combination of rules of the basic types. Inversely, a structure of basic types and rules of these basic types may be automatically derived from predefined rules of the object. Instead of the basic types lying outside the object, of course other objects such as external representatives may take their place.

If an object becomes too complex in order to be able to be represented efficiently on only one level of basic types, then it may be split into objects which again consist recursively of objects or basic types. By way of this splitting which is not limited in depth, one may also represent very complex interrelations in a transparent manner.

Special objects are defined and used according to generally known principles of object-orientated programming and modelling. Each such object inherits the previously introduced and further general object characteristics and furthermore comprises further specific characteristics. It thus uses a part or all definitions of a general object. Further general object characteristics are attributes or functions for storing changes of the object itself, the acquisition and interaction of data from the modelled real process;

the representation of notes, operating instructions, settings, checklists and/or assessments, which relate to the object;

the representation of the content-related quality of the object, for example result of automatic analyses of the completeness and consistency of the object description.

The representation of the risk, measurement, costs, cost type, metrics, etc.

Each of these definitions per se itself represents an object which was conceived from the basic types. For example in the object "risk" one may use the basic types in the following manner:

Basic type merge: for each relation of another risk, the basic type makes a note of corresponding dependencies, accepts content-related information from this other risk and from this for example determines a modified risk.

Basic type split: for each relation to another object which has a risk, the basic type makes note of a dependency and passes on corresponding content-related information to this other object or to its risk object.

Basic type transfer (straight) or source: for each attribute, the basic type represents an attribute characteristic such as a tendency, a current value, a probability, a weighting, costs, etc. As a rule one basic type is used per attribute, except for when several attributes do not need to be evaluated independently in an analysis.

The basic type may also assume the function of an early warning system or monitor, which by way of its rules and/or exceptions monitors a value and at the same time determines a value or a signal which is required for describing a risk, may be of interest to other risks or is evaluated with an automatic analysis.

An interactive manner effect belonging to the risk and expressing a mutual influence or an interdependency is modelled by the basic type transfer (straight) or source. A direction and an intensity of the effect of a changed risk on another object are modelled with this.

Observation Levels

The model or the modelled system is preferably observed on several observation levels on which predefined objects lie. The system is in particular subdivided into three observation levels, called process level, element level and information and function level.

The process level forms an uppermost abstraction, which represents tasks and sequences as well as their interrelations amongst one another and to partner systems. The element level represents the support of the processes by way of technical and/or organisatory units or elements. Thus the complete infrastructure and organisation of the system is imaged on this level. On the third and at the same time lowermost level, the information- and function level, functions and information of the individual elements are represented in detail.

For example an event chain "employee introduction" is to be modelled in an administrative system. The event chain in a process "personnel administration" would run through a step or an activity "employee introduction discussion/interview", which contains a data acquisition. On the processing level which relates to this step, it is only shown that a discussion protocol has been set up. The event chain is likewise described on the element level, but with reference to used elements, in this case software applications. This description for example states that a discussion protocol is created with a text processing software X, is stored in a data bank system Y and is passed on to a certain person with a mail system Z. A representation of the same event chain on the information and function level describes a file type and a predefined inner structure of the discussion protocol, as well as rules for naming and filing/depositing the file.

In another example, a process of a "print machine installation" is defined. In a real printing installation one may combine various print stations, folding and cutting machines with one another in various manners. An individual specific printing contract/order "create Saturday Morning Post" corresponds to a certain configuration of the installation and to a defined flow of paper through the installation, and is represented by an event chain. The specific printing contract demands very defined individual machines which are represented by elements. A certain machine in turn is controlled in accordance with machine parameters and [closed-loop] control functions which are modelled on the information and function level.

In a further example a product component is modelled. On the process level it is for example modelled by an object as a product "component delivery", on the element level by an object as the product "car door, left" and on the information and function level a corresponding object makes a note of where and how data for the description of the car doors is stored.

The interrelations between the individual levels, thus the subject matter that a process or an event chain is supported by certain individual machines and that these in turn require certain information and functions, is modelled by way of support relations. By way of this, for example control parameters of a machine may be associated with the printing contract via the machine. Thus control parameters for individual printing contracts may be individually specified. Accordingly, proceeding for example from a process layer, by way of following the relations, one may determine which are specific parameters and these may be changed. This results in a "drill-down" functionality, which means to say that when required, proceeding from a general overview representation, one may access infinitely detailed information of the system.

Observation Segments

Observation segments are defined orthognally to the observation levels. These are indicated as a "guide level", "business value level" and "support level". Each of these segments may contain objects of the process level, element level and the information and function level.

The business value level contains processes, elements etc., which contribute to the business value of an organisation or an installation, thus take a direct part in the production or processing of a product. These are therefore manufacturing lines, machines, outside work departments, etc. with associated processes, data and methods.

The support level contains processes, elements etc., which serve for supporting the sequences on the business value and guide level. These belong for example to information technology department, personnel administration, a shelf store system, procurement of raw material, etc.

The guide level contains processes, elements etc. which serve for the guiding of the business value and support levels. These in particular are management functions such as management, controlling with corresponding organisations, information technology means, etc.

By way of the splitting into these observation segments and by way of the association of costs and degrees of support, one may determine which units to which extent and with how much effort, contribute to a product and as the case may be to a profit.

Figure 3:
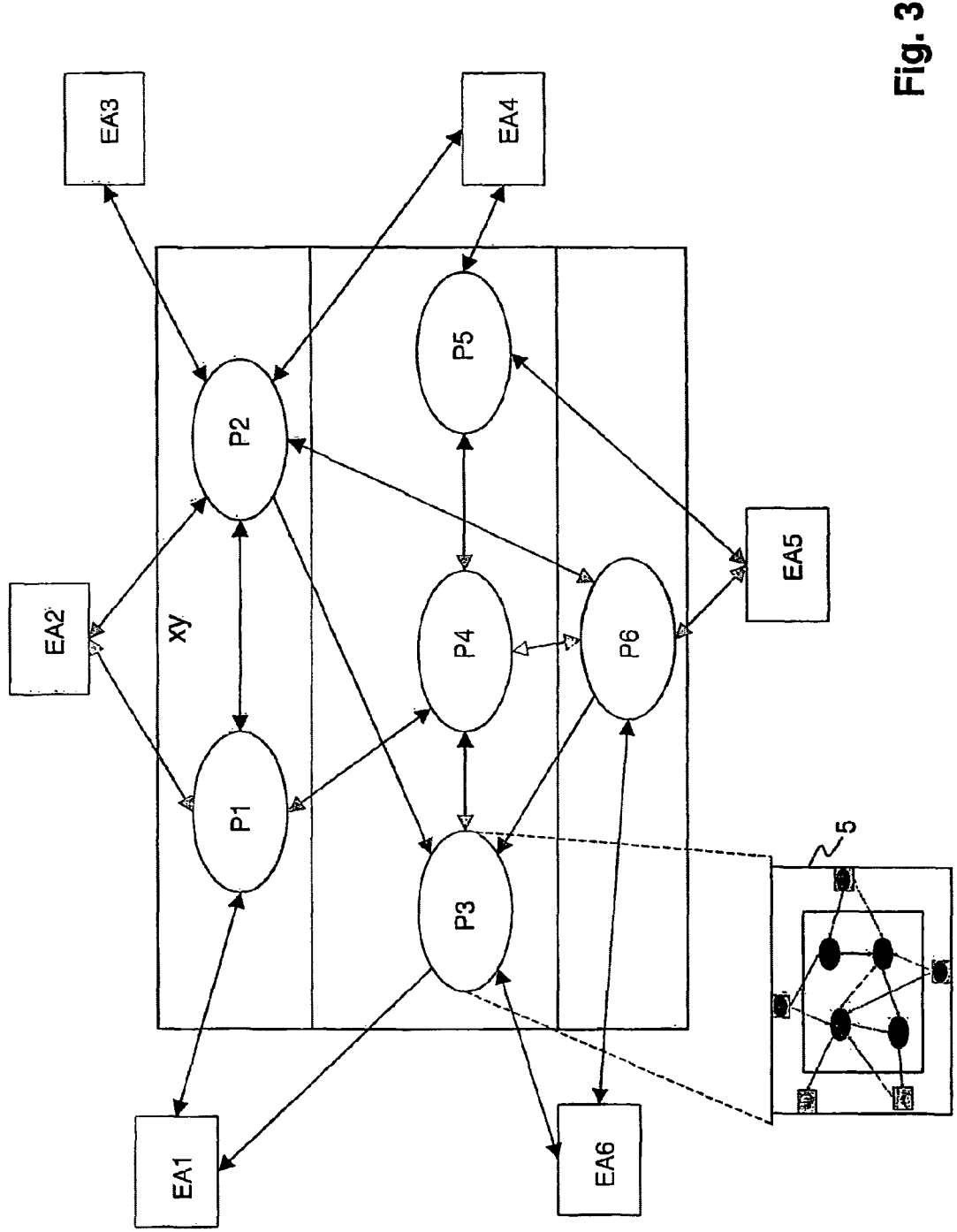
FIG. 3 a process model.

FIG. 3 shows a representation of a system with model elements on an uppermost modelling level or abstraction level, for example on the process level. Individual processes P1 . . . P6 are represented on the three levels as also the relations between the individual processes. The "external representatives" are indicted at EA1 ... EA6. The processes P1, P2 lie in the guide level, the processes P3, P4 and P5 in the business value level and the process P6 in the support level. The processes and external representatives are described in the following:

Processes

A process is a summarising representation of a defined entirety of tasks and activities or sequences and decisions. A process has certain characteristics and a behaviour and comprises a number of basic types which individually are combined into an object. A process may be split into sub-processes. A process is always a constituent of a process model and on each of the three observation levels forms an uppermost abstraction step for describing the observation levels. A process obtains input or data from other object types such as process or external representatives and produces output or data for such object types. This input and output form a characterisation of the process and of quality, performance and added value of the process. Each process comprises attributes for describing costs, risks, measurement parameters, uses, quality, instructions, experience values, etc. Alternatively to this, such information is described in each case by special description objects instead of attributes.

A description of data exchanged by a process, that is to say input and output of the process is indicated as "Service Level Agreement" (SLA) or process interface description. The SLA is a working means which is transported between two predefined objects and thus corresponds to the description of the interface and defines this.

Relations of a process to other model entities for example describe reciprocal dependencies on risks, costs, utilisation/ loading or support, as well as interrelations with a project, with an event chain, with planning goals, etc.

Preferably a predefined object activity is used for a semantically and syntactically correct and complete description of a process. An activity is also an extended instance of a general object, with a sub-quantity of the general object properties and with specific characteristics. One or more activities are assigned to a process.

Figure 8:
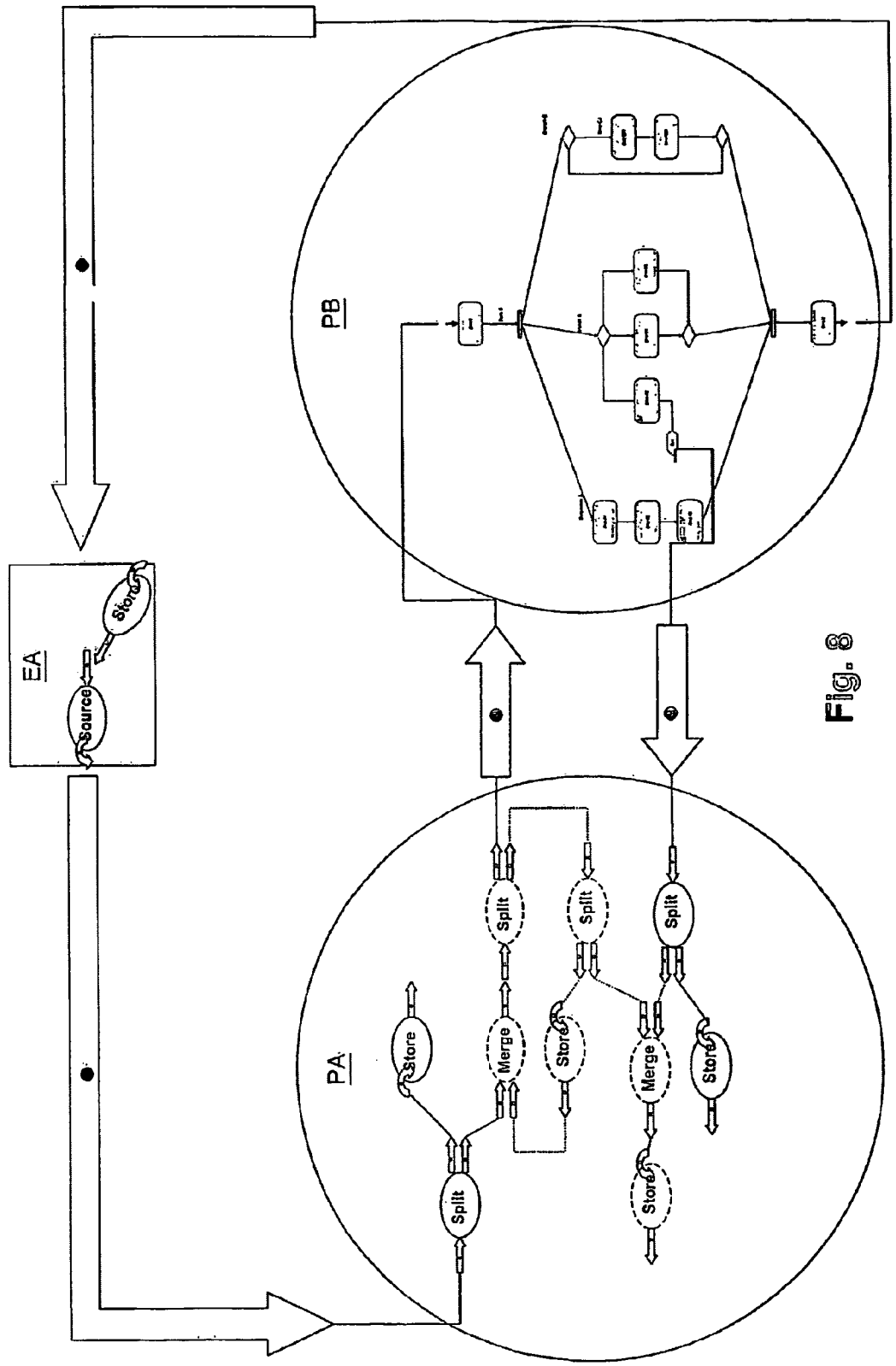
FIG. 8 a representation of a process by activities.

Such a description is represented on the right side of FIG. 8 by way of an activities diagram with the example of various types of activities, sequence, individual step, splitting, branching. The representation, in a manner known from computer technology, describes a sequence or control flow within a process or an event.

External Representatives

Figure 4:
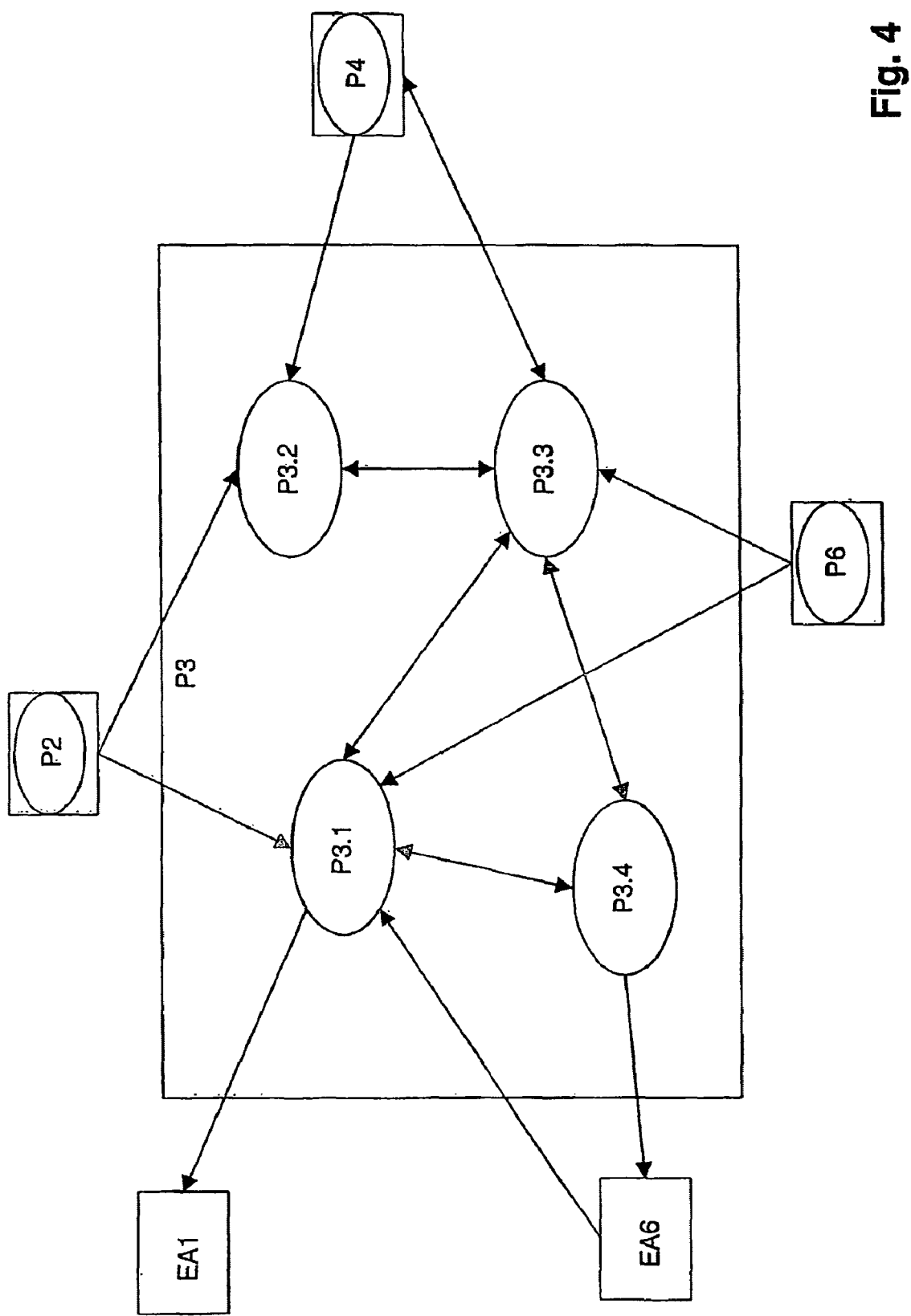
FIG. 4 a process model, divided up into sub-processes.

If an object lies outside an observation framework or outside a certain process model, then this object is called an "external representative" or also a partner object or foreign component. An external representative like a process, is an instance of an object with general as well as specific characteristics and behaviour. If a process is split and by way of this is broken down into sub-processes, then with this, new, and seen from the point of view of the sub-process, external representatives arise. Such a break-up 5 is shown reduced in size in FIG. 3 and enlarged in FIG. 4. P3 is split into P3.1 to P3.4, and from the processes P2, P4 and P6, which were still processes on the higher level according to the view of FIG. 3, external agents have arisen from the point of view of the sub-processes of P3. External agents may thus represent other predefined objects depending on the context.

In a further application of external agents, an external agent in a first model represents a completely different second model. This means it unifies all characteristics and behaviour of a model. The external agent may thus be a representative for many various objects or object quantities. For example:
  an external agent "market" represents a place-keeper for a further entity which is not modelled,
  an external agent "partner" represents a modelled process by way of which the "partner" has assumed a role by way of outsourcing and is directly integrated into the process chain,
  an external agent "department" corresponds to a complete part of an entire system which not interested in detail in a certain interrelation.

The external agent as a representative is subsequently normally connected to an object within a model limit by way of a flow relation.

Event Chain

An event chain represents a recurring action sequence within the system. Depending of the context, event chains are also indicated as "use-case", or as "business value chain".

The individual steps in an event chain are tasks and process steps which take their course in a sequence and with certain peculiarities. A data flow of a use-case always describes from where and to where a certain piece of information flows. Apart from the basic object definitions, an object event chain has the particularity that it represents an edge and not a node of a network. For example a product is processed or manufactured along this edge or chain. Observed generally, a multiple value arises along an event chain. To represent changes which take their course with this, the event chain is subdivided into part flows or part chains according to which individual products or working means are manipulated. The individual part flows are assigned to processes and/or activities. The event chain may be represented or defined by way of activities.

Concluding, a process represents a part of a system which in a general manner is capable of certain actions, whilst an event chain or an activity represent actions carried out once with regard to a specific occurrence.

Figure 5:
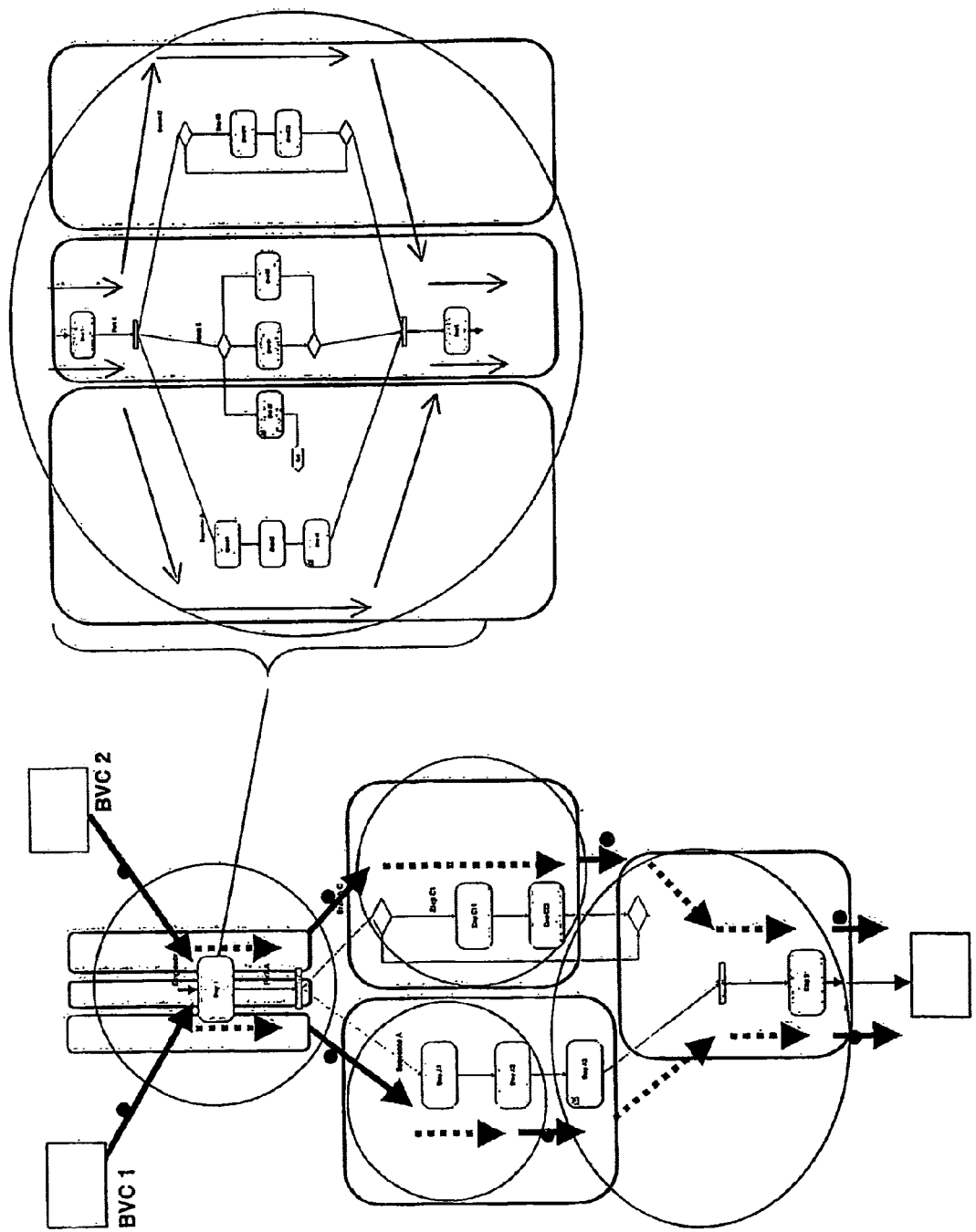
FIG. 5 event chains by processes and with the support by elements.

Several model aspects are represented in FIG. 5 in a superimposed manner: processes are symbolised by ovals, activities by horizontal, rounded rectangles and event chains by thick arrows. Vertical, rounded rectangles represent elements which are explained further below.

FIG. 5 thus shows two event chains whose individual part flows always correlate with a process or with an activity within a process. With this, also several part flows of a chain may be assigned to the same process or the same activity. Elements may serve several processes, and a process may be supported by several elements. This corresponds to the fact that for example a manufacturing cell may be used for several manufacturing processes and vice versa. Furthermore one may see how certain part flows of an event chain take their course completely within a process, and others only represent connections between processes.

Element Level

A further special predefined object is represented by the element. An element represents how a process or an activity is supported by real entities. Preferably four types of elements are used: 1 information technology (IT), 2. organisation, 3. tools, and 4. mechanical-electronic modules.

This support of processes and activities is represented in FIG. 5 by one or more elements (vertical, rounded rectangles). Thus an event chain is also indirectly supported by one or more elements. With this, the event chain on the process level and that on the element level do not need to be subdivided equally and also need not at the same time to use the same working means. However, it is important that all the mentioned objects are in a defined relation to one another, which means that by way of suitable relations it is represented that a certain event chain consists of certain activities and these in turn are assigned to certain processes and elements.

Information and Function Level

The information and function level models units, which support the elements. These in particular are information-technology units such as data and methods, and specifically data which image the reality in the system as well as metainformation on this data. The data is typically values of attributes or variables, which are stored in data banks or programs, as well as readings and control parameters of installations and machines. Metainformation describes a significance of data, data structures, data bank structures, file information, logical interrelations or computation rules for converting data. Methods describe procedures or programs for data processing and/or machine control.

Relation Types

Basic types and objects are brought into relation amongst one another. Relation types thereby define a behaviour of two objects or basic types which are in a relation to one another. Relation types themselves are also modelled as objects. With this, one differentiates between four relation types which are hereinafter described in more detail:
 a) If two objects are permanently in a relation then the relation type permanent is used for the description. This relation corresponds to a mutual reference.
 b) If one object triggers a reaction with another object, then the relation type interaction is used. With this, defined effects with another object may be achieved.
 c) For representing a dynamic situation, the relation type flow is used. With this, one represents that not only an effect, but also contents between objects in a certain condition are displaced.
 d) If with a connection of two object, one sets a respective functionality of these objects in relation to one another, one then defines the relation type gap.

The Relation Type "Permanent":

One differentiates between two permanent relation types, a static and an exchange relation.

A static relation represents a permanent mutual relation between two objects. For example, a mutual reference of two objects is represented by a static relation. With this, in both objects, pointers to the other object, for example as a navigatable link are instanced and for example linked with the name of the other object. This same type of relation is also used if an object is in a static correlation with another object and this fact is to be constantly displayed.

The exchange relation represents a relation between two different, predefined objects which follow fixed rules, for example according to a type conversion. With this, an object is exchanged into one or more objects of another predefined type. As to which relation, and under application of which rules the objects are to have with one another is fixed in the respective objects concerned. After the instancing one may navigate via this relation, and the objects being in relation recognise the type of exchange as well as the details or the respective other object.

For example exchange relations represent that a certain process comprises several activities. A process "manufacture" for example comprises a quantity of activities such as "manufacture product A", "obtain intermediate product" etc. These in turn are each assigned to one or more event chains, which is likewise represented by exchange relations. A process "personnel administration" for example comprises the activities "employ employee", "assess", "dismiss".

Other exchange relations for example represent an interrelation (connection) between a product and between services which may be observed as a product.

The Relation Type "Interaction":

With an interaction relation, one object has an influence on another one in any form or has a dependency on this. However an actual flow of contents between these objects does not arise, but the relation itself describes a certain, known type of influencing. The one object on account of its characteristics and its behaviour has an influence on the other one. Preferably five different types of interaction are to be differentiated:

An interaction type influence represents a percentage dependency between two objects, in particular a percentage distribution key or dependency key. For example if an influence relation states that a certain output or production target, such as "less than 2% rejects" or "less than 5% fluctuation", is assigned to a process, for example the "manufacturing department". The association is effected for example by way of a strategy object. A strategy object thus distributes goals to other objects for the purpose of a later control of the goal achievement.

An interaction type support represents a percentage dependency or a distribution key with defined rules and definitions between characteristics of two objects. This relation type is of special interest if predefined objects are located on different observation levels. One may then represent and see a dependency or coupling of the levels, which is to a greater or lesser degree. For example support relations represent that 60% of total available information technology means or services and 50% of the work output of an administrator are necessary for supporting a certain production department. In another example they represent the fact that a manufacturing process requires 30% of an NC-machine and 40% of a certain manufacturing cell.

An interaction effect represents an effect by way of triggering a reaction based on fixed rules and definitions. A method or an algorithm for determining the reaction is defined in the object in which the effect takes place. The effect takes place without conditions, the reaction according to the result of this method. For example, a first object by way of obtaining values of risk, performance, costs, quality, degree of fulfilment, etc. has an effect on a second one. The second object according to it own method for example determines a total risk or a process risk.

The relation is one-sided in the sense that the effect only takes place in one object and the triggering object is not affected. Accordingly, for modelling a mutual effect, a second relation must be instanced in the opposite direction.

An interaction type change represents an effect with which the change is effected according to freely or fixedly definable rules. With this, an object which transfers a message does not know whether and how this message is processed at the receiving object. The type of message ("measurement data", "error parameters" etc.) is however known beforehand. With this interaction type one preferably represents:
 a transfer of readings to a controller;
 after triggering a manufacturing order for a product, several manufacturing units concerned are activated;

an optimal error recognition, or the assigned model object transmits error data to a manufacturing line; parts are reworked depending on the error type; if too many errors occur, a machine concerned is adjusted;

a number of demotivated employees are transmitted. If a certain number of employees is demotivated, job advertisements are triggered;

when employing a new employee, corresponding [ex] change information is sent to different objects which thereupon, for example automatically, produce a vacation/post profile, set up an e-mail account, give rise to an interview, etc.

An interaction type join represents a placing of goals or performance features such as risk, costs and various measurable variables. The goals are broken down or distributed into several subordinate objects by a higher-ranking object by way of this interaction type, i.e. each of the subordinate objects by way of this obtains its own part goal which it is to fulfil and which may be used for assessment with actual results.

The Relation Type "Flow":

Until now only a static relation has been defined, via which dependencies or computations may be set up. The type of relation or the obtained information was always known beforehand. The subsequent two definitions define dependencies with which a flow is to be represented, wherein the essential difference to the previous one is the fact that content was displaced between two predefined objects, whose processing may trigger something unforeseen. This content in turn corresponds to a predefined object. One may represent dynamic and content-related dependencies by way of these flow relations.

A dependency type content represents a content-related relation between two predefined objects, wherein a transferred content, for example a file, triggers a reaction depending on the interpretation by the receiving object. The content relation thus represents a dynamic connection/joining on different detailing levels.

With a dependency type event, the content only represents one trigger. In contrast to a change relation however the content is defined and set by the receiving object.

The Relation Type "Gap":

A gap relation represents differences between two predefined objects and renders then understandable. For example the two objects represent an actual and a nominal condition of a system, and the gap relation the difference between the two conditions.

In the following, and as an overview, it is specified for various relation types between which objects they are preferably used. Important relation types are in particular the static relation, influence relation and content relation.

| Relation type | Objects taking part |
|---|---|
| permanent | |
| static | all types |
| exchange | process—activity, element—interface, interface—service, service—parameter |
| interaction | |
| influence | strategy—object, requirement—object |
| support | process—element, process—event chain, Activity—event chain |
| effect | interdependence risk, personnel matter, costs, others |
| change | goal - risk, goal—measurement |
| join | risk, measurement, linking |
| Flow | |
| content | process—external agent, process—process, event chain—object; if content is transported |
| event | process—external agent, process—process, event chain—object; if only trigger is defined |
| Gap | all types, via compare & merge—connections |

Product

One differentiates between three types of products, which may all assume one or several conditions; a product itself, as the highest abstraction, as well as a working means and a result. The working means represents all types of contents, which are used in combination with company development and process management. The working means also represents the smallest unit of a product. Working means may occur in an isolated manner or in various other combinations and may arise in different levels and various combinations. A working means may thus for example be a physical part of a product, but also a computer-readable file or the information contained therein. A quantity of working means defines an elementary product. An elementary product may be combined with other elementary products into a put-together or composite product. An object "product" represents a summarising or changing layer of several working means. For example, this is the fact that an object consists or is manufactured of a quantity of components, or that a chemical processing of initial substances results in a final substance, or that a set-up of hardware and software costs are seen as general costs on another observation level, and as investments on another level.

Summary

Figure 6:
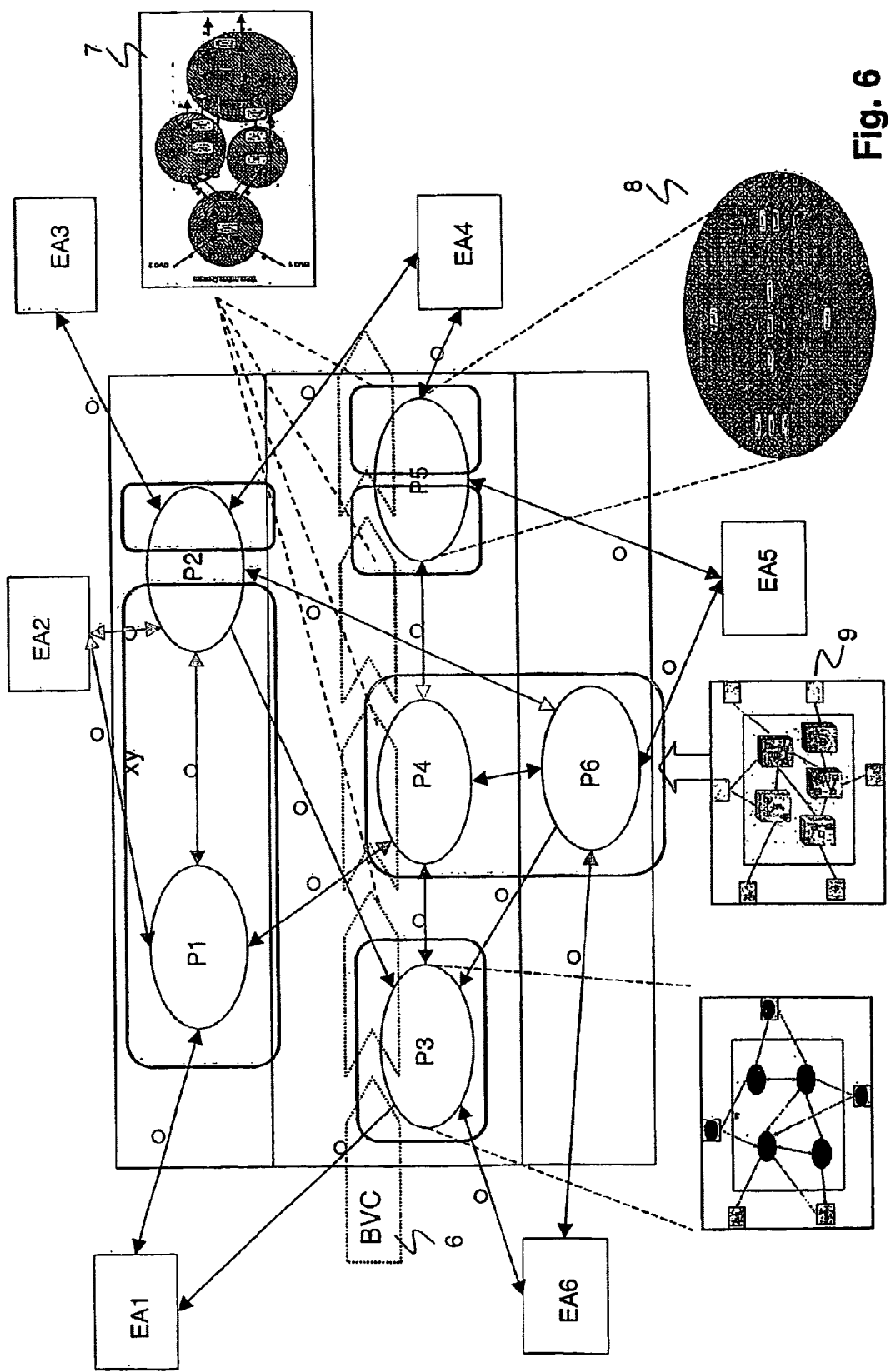
FIG. 6 an overview representation.

The previously defined objects in a model have various dependencies on one another. These dependencies are represented in FIG. 6 in an overview for an exemplary model. A process model consists of processes P1-P6 which are connected to one another by way of flow relations. If a relation exists beyond the model limit, this is effected to an external representative EA1-EA6. Working means or products flow in a defined condition via these relations. All these objects may be split up (process into sub-process) or may be described by way of another object type (process by activity) which may be represented by corresponding relations. The processes P1-P6, external representatives EA1-EA6 as well as activities are supported by elements of a predefined type. Tasks and sequences as well as interrelations are characterised with process models, the infrastructure support and organisation support is characterised with the element model, and specific details with the information and functions model. These three models simultaneously also form observation levels. A three dimensional representation 9 visualises the presence of observation segments as well as also observation levels. In order to document specific application cases and their value changes, event chains 6 may be defined on the step of process, activity or on the step of element. The individual part flows of the event chain 6 are connected or brought into relations with the corresponding objects of a certain observation level. The predefined object event chain thus represents specific sequences and may be used on all observation levels. One represents in a detailed manner for example by way of an activities diagram 7. Activities diagrams may also be applied for representing sequences 8 within processes. Event chains additionally to the models, form an additional dimension and link objects and levels. By way of this various analyses and computations are made simpler or are rendered possible at all. Furthermore, the product model is used and the project model which images all changes between two points in time.

The modelling principles are represented in the following by way of a very simple example:

FIG. 7 shows predefined objects of external representatives EA and processes PA, PB, as well as directed relations shown as arrows, and working means 10 which are relevant for the definition of the relations. Furthermore a use of the basic types in a detailed representation of the external representative EA and in the processes PA, PB is imaged. The complexity is smaller or larger depending on the instancing and the characteristics. This is expressed in the external representative EA by way of the use of only just two basic types. If a certain amount of complexity were to be exceeded, then various predefined objects would be used instead of these basic types.

In FIG. 8, an activities diagram defines process PB alternatively to the representation by the basic types. Since with regard to the activities it is in turn the case of predefined objects, they also have a defined quantity of basic types, or are expressed by these. FIG. 9 shows an enlarged version of an activities diagram with branching, parallel paths, sequences etc. and by way of example, of a representation of an individual activity by a quantity of basic types.

Figure 10:
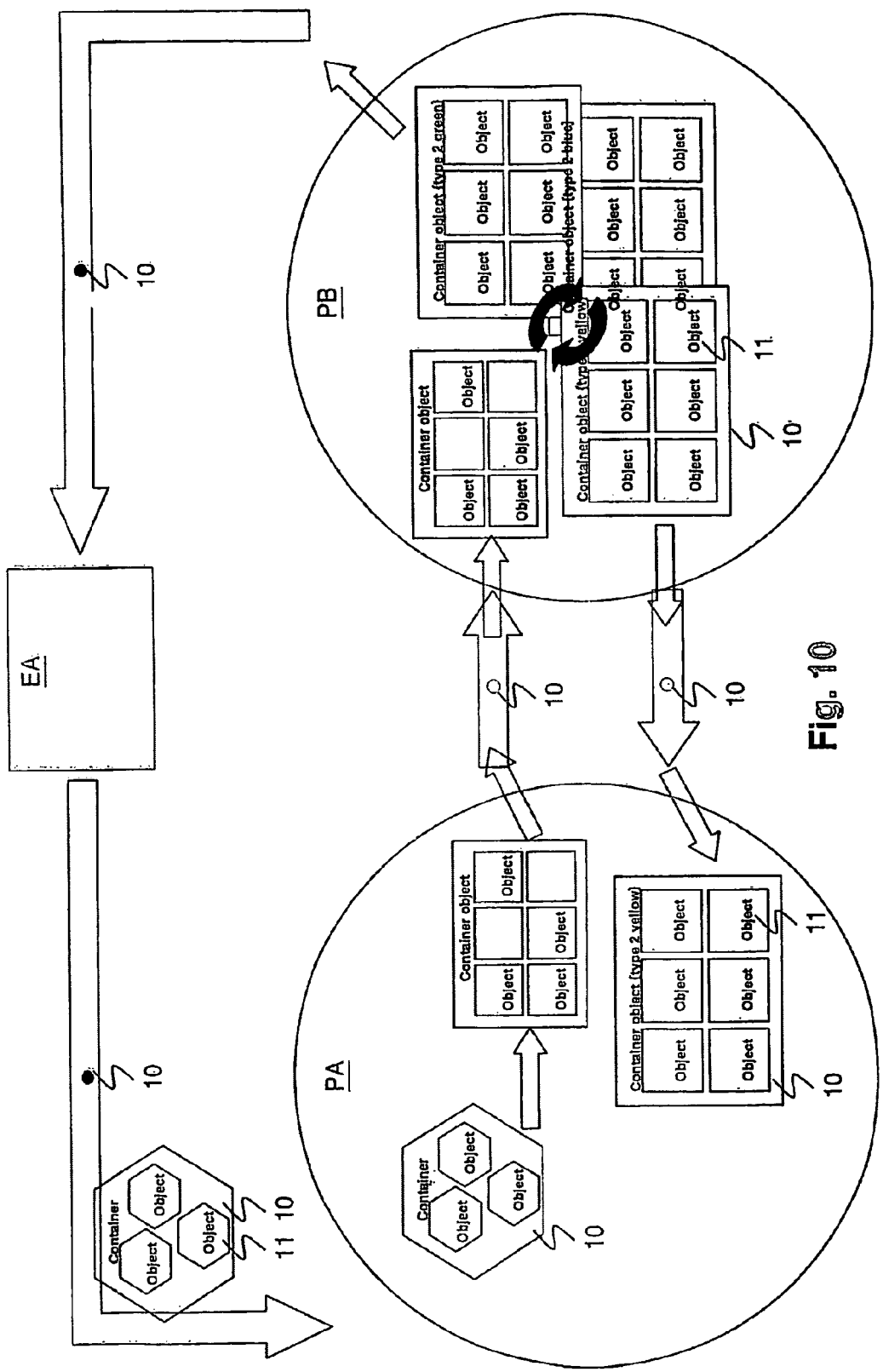
FIG. 10 a predefined object "working means"

In FIG. 10 the working means 10 which are displaced via the relations are shown in detail. A product 10 or a working means 10 may in turn consist of several other working means 11, which may be represented via a suitable object-orientated software definition. It is likewise evident from this picture that the working means at the same time represents the output on the one side and the input of processes on the other side.

Figure 11:
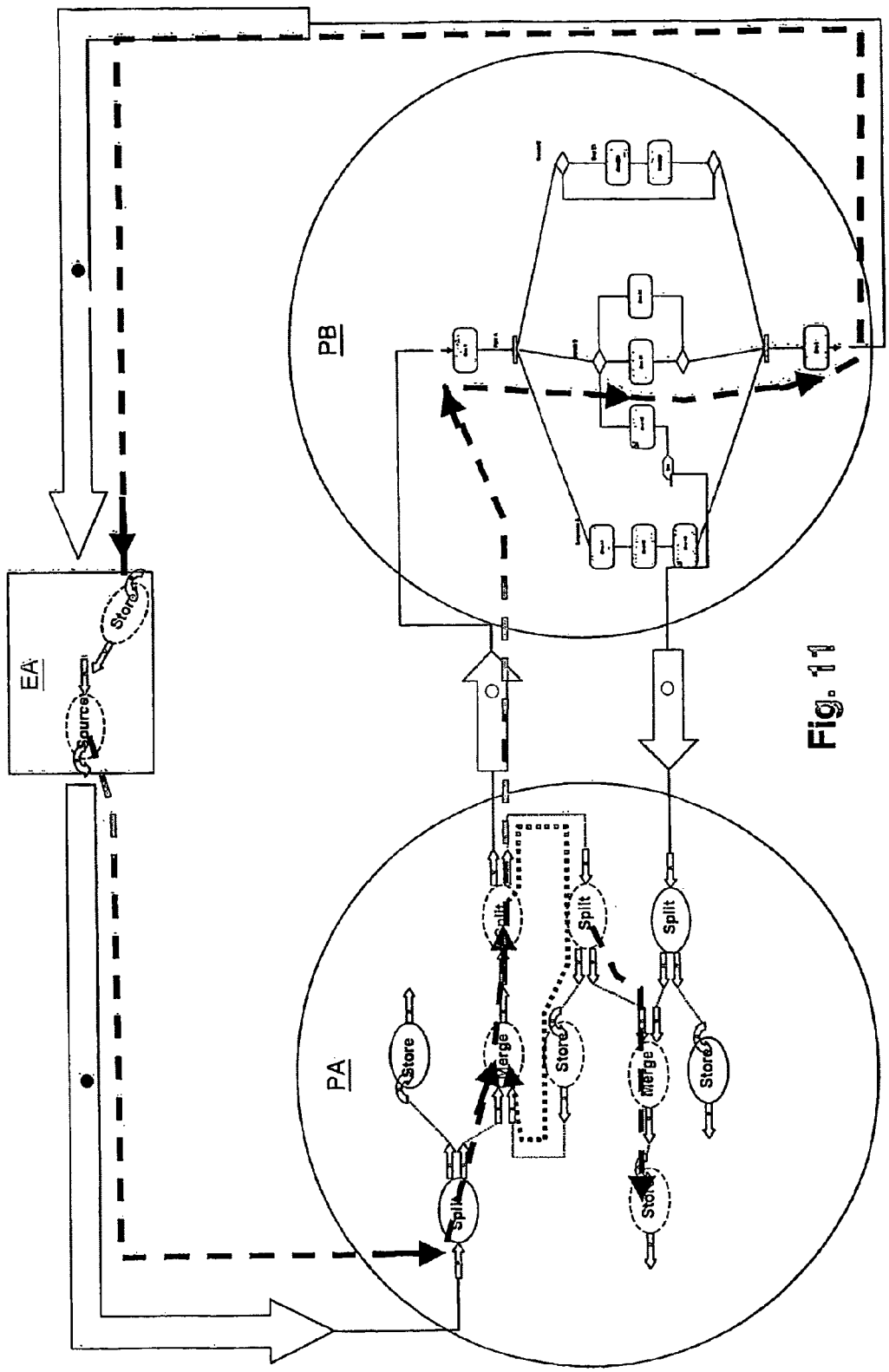
FIG. 11 a predefined object "event chain"

Up to this point, no specific application cases have yet been defined in the example, but only the complete system which has a potential for processing cases of application. Specific cases of application which may occur in practise are represented with event chains, and claim a smaller or larger part of the system. Dashed arrows in FIG. 11 represent such an event chain. From this, it is evident that often only a part of the system definition, thus for example of the processes and activities, is applied in a certain event.

Based on the introduced model elements and model interrelations on account of the predefined objects, one may carry out further methods, analyses and computations described in the following. Thereby, one deals with:
- automatic model generation and updating;
- quality checking of models;
- risk analyses;
- analysis of costs and their relations;
- performance assessment;
- comparison of models or represented systems;
- process control; and
- user interfaces.

Manual and Automatic Model Formation

In order to represent a specific system, thus a manufacturing system or a company or an organisation, various information is called up and imaged as instance values of predefined objects, and interrelations of the objects are likewise represented in the model. This information acquisition is effected manually and/or automatically.

With the manual acquisition, preferably icons which represent the objects are placed on a screen by way of known indicator means such as a computer mouse. Relations are inputted by connecting the icons. For the specification or instancing of attributes, one may represent input masks for each object, which have text fields, menu lists and other known input aids. In a preferred embodiment of the invention, objects are represented and manipulated in a tree structure.

Preferably thereby one proceeds as follows. Firstly process models are set up, subsequently event chains are laid onto the process level and these chains are specified by way of activities. The specification of the process control flows is set up in an analogous manner. Product definitions are also set up parallel to this processing work. The product definitions are specially used with relations between objects. If the process level is completed, the element level is created. The required element types are produced and put into the correct dependency on the processes and on one another.

A specific element model is produced with these steps. The individual elements are subsequently linked to the objects on the process level. Subsequently the event chains are acquired on the element level. The information and function level is created as the last level, and is described by way of special predefined objects. These objects are preferably specially directed to the representation of information technology principles or data and function descriptions. They thus for example describe data structures, access relations, individual data and their significance, interfaces, etc.

The automatic acquisition is effected by special analysis programs which search through an existing information-processing structure or installation, determine interrelations between data processing and/or data-storing units, and set up various types of objects and relations for imaging this data and these interrelations in the model. With this, in a preferred variant of the invention, the following method is used: an information technology landscape or a software system comprise several processing units, which is to say programs or data banks, wherein the programs are linked to one another by way of requests, and the data banks are linked.

The method systematically reads the code of all programs, for example a COBOL source code, and in each program retains which other programs with which transfer parameters and with which results were requested. It is also retained as to which data banks and as the case may be, which tables of the data banks were accessed and with which request and results. Internal links of the data banks are likewise acquired. The method is applied recursively to each program and to each data bank, until all have been run through and thus all existing links have been acquired by way of requests or inquiries. During the acquisition, objects for representing the respective found programs, data banks and links are automatically produced in the model. For this, preferably the predefined objects, element, interface and working product are applied. The scanner is configured depending on the object type and fills out all objects and relations between the objects according to definition. For example a real program and a data bank are in each case represented by objects, data bank inquiries by relation types, and results of data bank inquiries by working products.

The found elements and links define a graph. This is represented visually, for example as a graph with nodes and edges, or as a link matrix. An illustrative representation of the dependencies arises on account of this, which in particular permits critical components of the information technology system to be recognised. Such for example are a data bank or a table which may be accessed by a large number of other programs. A change of an interface into such a component would thus cause a greater effort. Conversely, components which are only slightly used or not used at all are determined.

Model parts alternatively to this may also be produced from data of known management tools. Such data is read from data banks or export files by conversion programs, and objects for representing the relative model parts are automatically produced. Conversely, model information for use and/or visual representation may also be exported into other programs.

The modelling methods observed above relate primarily to a modelling of structures and in the second instance to an acquisition of model parameters or attributes of objects which are embedded into these structures. If one structure is essentially known then one may automatically determine the parameters. For this, several physical sensors, but also auxiliary programs which serve for the extraction of data from a running system are applied. These auxiliary programs are also indicated as sensors in the following. Values detected by sensors thus originate from real components of the system and effect a compensation of the model with the real system taking its course. The values are led to corresponding objects in the model which model these components. The values are processed further according to the object-specific and user-specific rules contained in the model, for example by way of storage in the object, updating the model with current values or by way of statistical analyses of the values, regulation or control of the system, etc.

With the model formation, in a preferred variant of the invention, one activates an object-production engine with commands for object manipulation via an interface engine which realises a plan for object production. One may also directly access the object production engine by way of an adept user. The object-production engine access a framework which puts the basic types into relation with the predefined objects, and produces or instances the required objects, links between their inputs and outputs, and further relations between the objects.

Model Verification, Quality Testing

After a model has been partly or fully created, it is examined by way of various analyses as to the correct use of individual objects and their relations. This for example is effected with the following testing methods, which grouped together is also indicated as tests of the model quality A model test checks whether an external agent, a process, a working product and a process interface description have been defined, and whether the objects are correctly and completely in a relation to other objects according to the definitions of the former mentioned objects, whether no open relations are defined and whether objects are used not in an undefined condition.

A completeness test checks whether a process is supported correctly by elements and activities, and whether a process is used in an event chain.

A consistency test on the object level checks whether an object is not used and is completely without relations by way of references or flow relations, and whether it references non-existing objects.

A transparency test checks whether objects have a goal or a description. Specifically, this corresponds for example to an examination as to whether certain text fields of a mask have been filled out for object description, thus have a content.

A quality definition test checks whether quality settings of individual objects are defined by way of metrics. Only when these are present is a subsequent assessment of the quality of a process or an event chain etc. possible. Specifically, this for example corresponds to a test as to whether field of a mask for object description containing quality settings have a content, and this content, as the case may be, corresponds to certain conventions. With the quality assessment, amid the application of metrics, interrelations, relations and contents are verified and quantified by way of conclusion of the quality. The quality settings and quality features of objects are to be distinguished from the testing of the quality of the model itself which is observed here!

Warnings are produced if a process has only one entering flow or only one exiting flow. The mentioned analyses may be extended by way of Plug-In's and with the application of user-specific rules.

The previously mentioned tests of the model quality thus relate to consistency, correctness and completeness of the model.

An extended consistency test is carried out in that it is ascertained whether different model aspects of the same facts or aspects of the reality agree with one another. If with this, the same object is used in two different models with a different detailing degree or with a different view to application, one may draw a conclusion on the correctness. In particular, event chains are compared to process interface descriptions.

Figure 12:
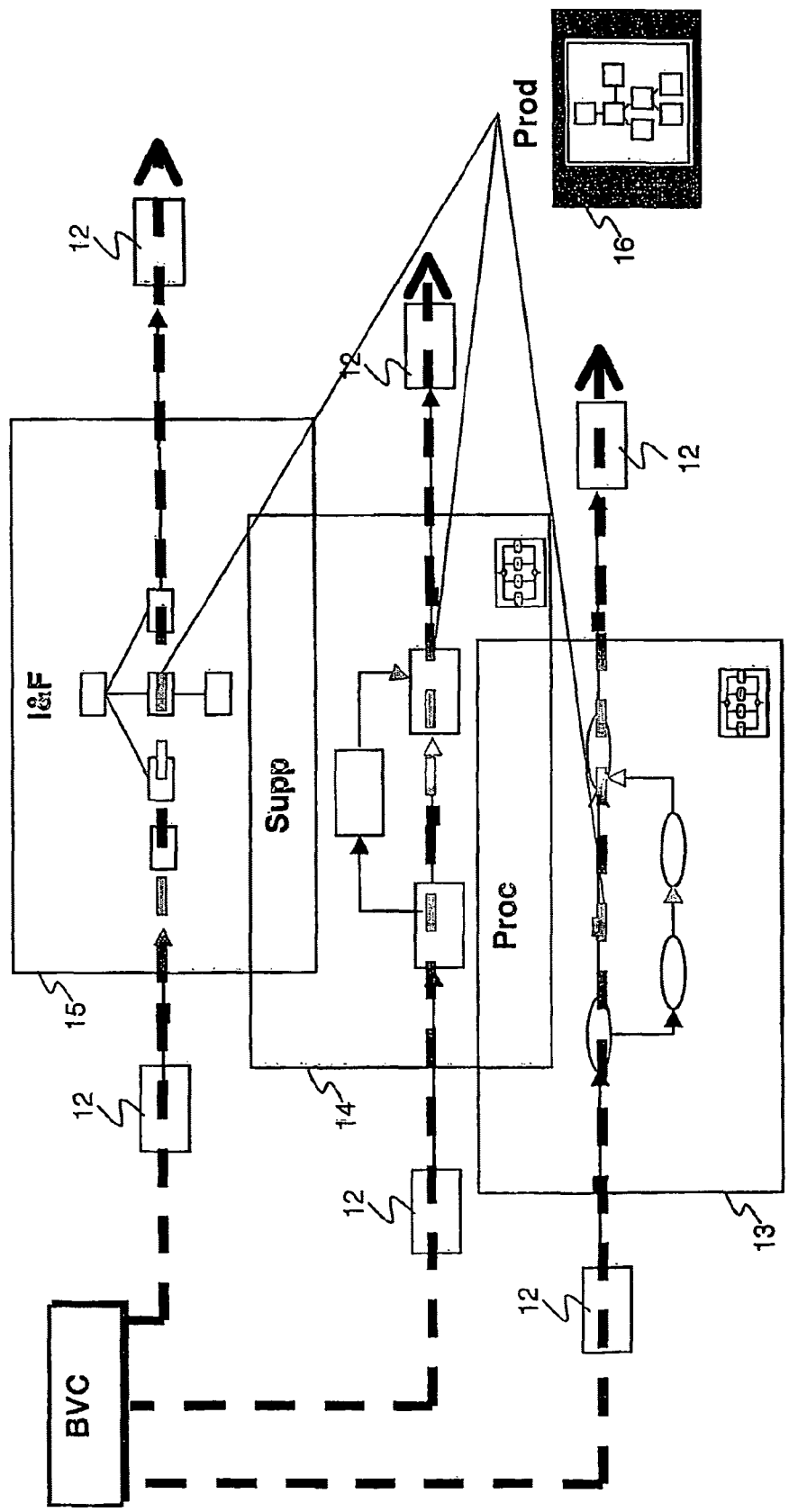
FIG. 12 observation levels for validating and for quality control.

FIG. 12 schematically shows a basis for a validation method. Validation is to be understood as the testing of conditions, sequences and models by way of at least one further model or another model aspect. Part models on the process level 13, element or support level 14 and on the information or function level 15, as well as event chains BVC and models of external agents 12 on each of these levels and product definitions 16 in each case image different aspects of the system in the model. These part models overlap one another in certain regions, and must be consistent in these regions if the model is to be correct. If thus for example the event chains or use-cases are compared to the process model and their definition, one may draw conclusions on the quality of the process model and the use-case models. The certification of the quality may on the one hand be effected as an index or by way of detailed information on contradictions and agreements.

Figure 13:
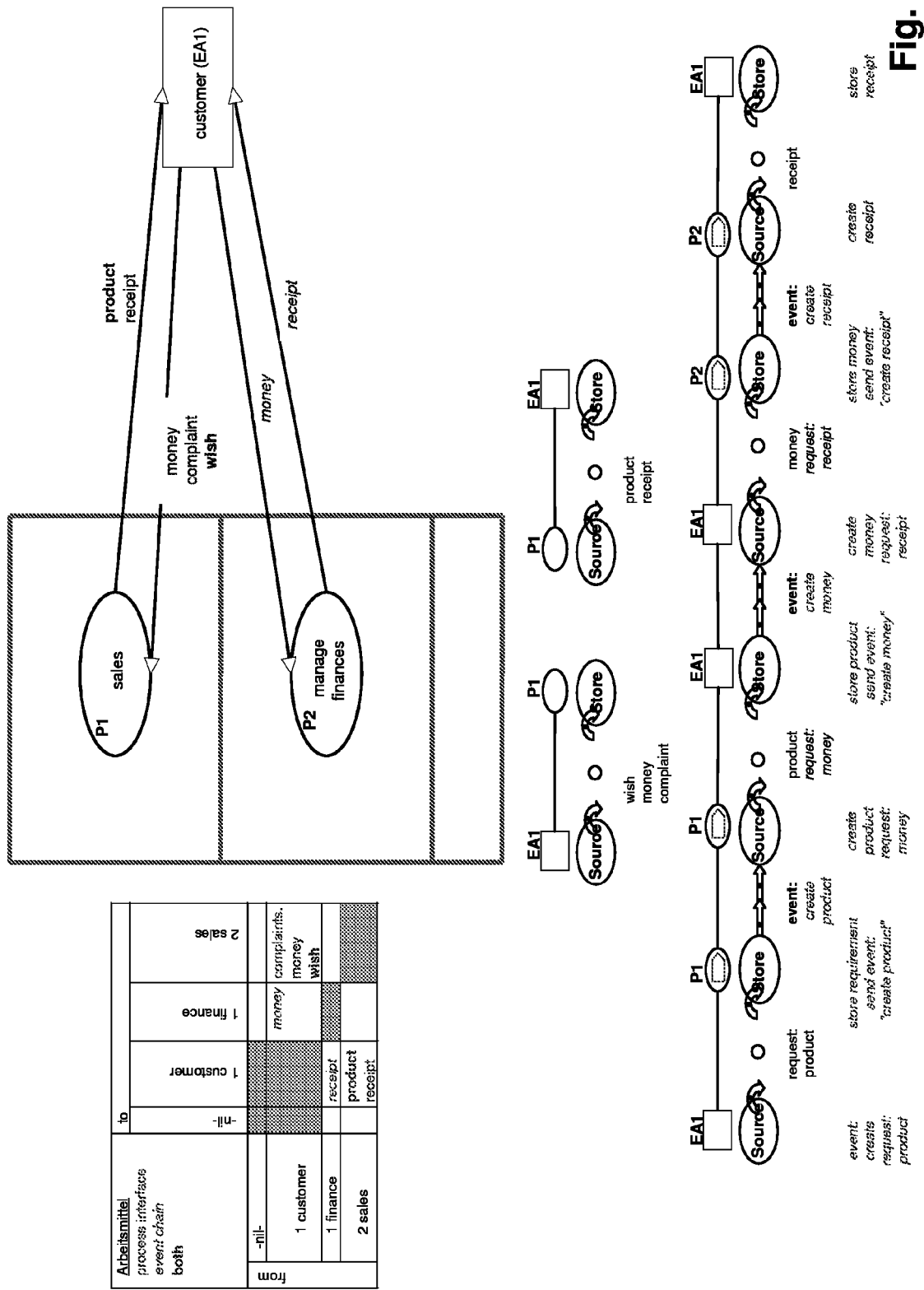
FIG. 13 an example of model validation.

FIG. 13 illustrates a specific example. Two processes P1, P2 and an external representative EA1 are represented in an upper part of the figure. Process interface descriptions are defined between P1 and EA1 as well as between P2 and EA1. These describe which working means are displaced via the respective interface. These working means in a technical system are for example products, individual parts, manufacturing parameters, order data, machine control data, measurement results etc. In an administrative process these for example are products, receipts, payments, orders, etc.

In a lower part of FIG. 13, an event chain is represented which runs through the mentioned processes P1, P2 and the external representative EA1. The event chain is preferably defined separately from the process interface descriptions. It describes a systematic stringing-together of events and actions as well as the displacement of working means or products. The basis of the quality checking is that each input and each output of a process is produced within the framework of a use-case. In a matrix represented in FIG. 13, the lines correspond to processes which output the working means (output), and columns correspond to the same processes but as receivers of working means (input). Possible working means which are displaced from one process to the other are entered in the fields of the matrix. Due to this one obtains an overview of all interfaces between objects. The same matrix is used in order to enter working means, which were used by a use-case, into it. It may then be ascertained whether an overlapping is present, that is to say a working product occurs in both definitions. With a working means which has no overlapping, then either the process definition or the definition of the use-case is incomplete. In the example matrix, working products which have only been used in the process interface description are in normal lettering, and those which have only been used in an event chain in italics, and those which occur in both descriptions in bold lettering.

In FIG. 13 is also shown how working means are created "create" and stored "store" and events are sent "send event".

The same principle is also applied to other predefined objects and other types of interrelations. With this, the consistency of descriptions of an event chain are checked on different observation levels. For example, an event on the step of process and the same event chain on the step of element are compared to one another. With this observation and taking into account of the fact that processes and their supporting element are connected to one another by relations, one may make a validation and a quality assessment on objects on different levels. This is in contrast to FIG. 13 where only one level is present, but a description by way of two different objects is present.

For this, preferably where a second interface between objects on a second modelling level is assigned to a first interface between objects on a first modelling level first interface, for forming a conclusion on the consistency, it is checked as to whether a working means which is transferred via the first interface, and a working means which is transferred via a second interface, are assigned to one another, or correspond to one another. One proceeds in an analogous method for several interfaces which belong to respective event chains on the two modelling levels: thus the interfaces in both modelling levels are compared to one another over the complete event chain.

Risk Analysis

The following principles apply for computing and propagating risk: Basically a risk-object may be assigned to each object. This in particular is useful for processes, elements, working means, and event chains, amongst others. A risk-object comprises a numeric representation of a risk of an object, as well as rules or computation rules for determining the risk on account of risks and of other attributes of other objects, in particular of readings of variables of the system. This risk is a measure of the probability that the object concerned does not fulfil its function or that certain characteristics are not correct.

The risk for example is represented on a scale between 0 and 100. Different colours (green/yellow/red) are assigned to individual regions of this scale for a graphic representation, and, assigned to the objects, are represented to a user or system monitor in tables, matrix representations or diagrams.

Rules for risk computation are for example expressed in the form of text with usual syntax, e.g. within the context of IF <<risk of process A>>>60 AND <<rejects from manufacturing cell X>>>10% THEN <<increase risk of an interruption of the total manufacture by 10%>>

Rules for dealings on account of risks for example express the fact that on exceeding certain risk thresholds, news is automatically sent via e-mails or SMS (short message system), alarms are activated or one intervenes in a production control. The latter is effected for example by way of putting a machine out of operation or by way of adapting control parameters, so that one operates more slowly, but with an improved quality. With this, it is useful for the risks to be computed according to current readings from the system, and for these to be continuously updated.

Also other risks may be defined for each object. Preferably a description and describing attributes such as probability of occurrence, a tendency, an early-warning indicator, a net and gross risk, costs, one or more actions for preventing the risk, may be defined for each risk If one wishes to compute the risk along a chain, for example along an event chain, then the largest risk determined along the event chain is valid as the risk of the complete chain, inasmuch as the mutual influencing of the risks is always positive and is effected in the flow direction. If further risks act on a chain as influence variables, then the risk value is determined depending on the risk effect and the direction.

In one preferred embodiment of the invention, a variation of risks and their dependencies are played through with a Monte Carlo simulation, and it is determined which objects are particularly prone or sensitive. In another automatic analysis, with the presence of loops in the risk computation, on account of several objects, one detects whether the risks accumulate, run into extreme values or stabilise.

Relation Analysis

Figure 14:
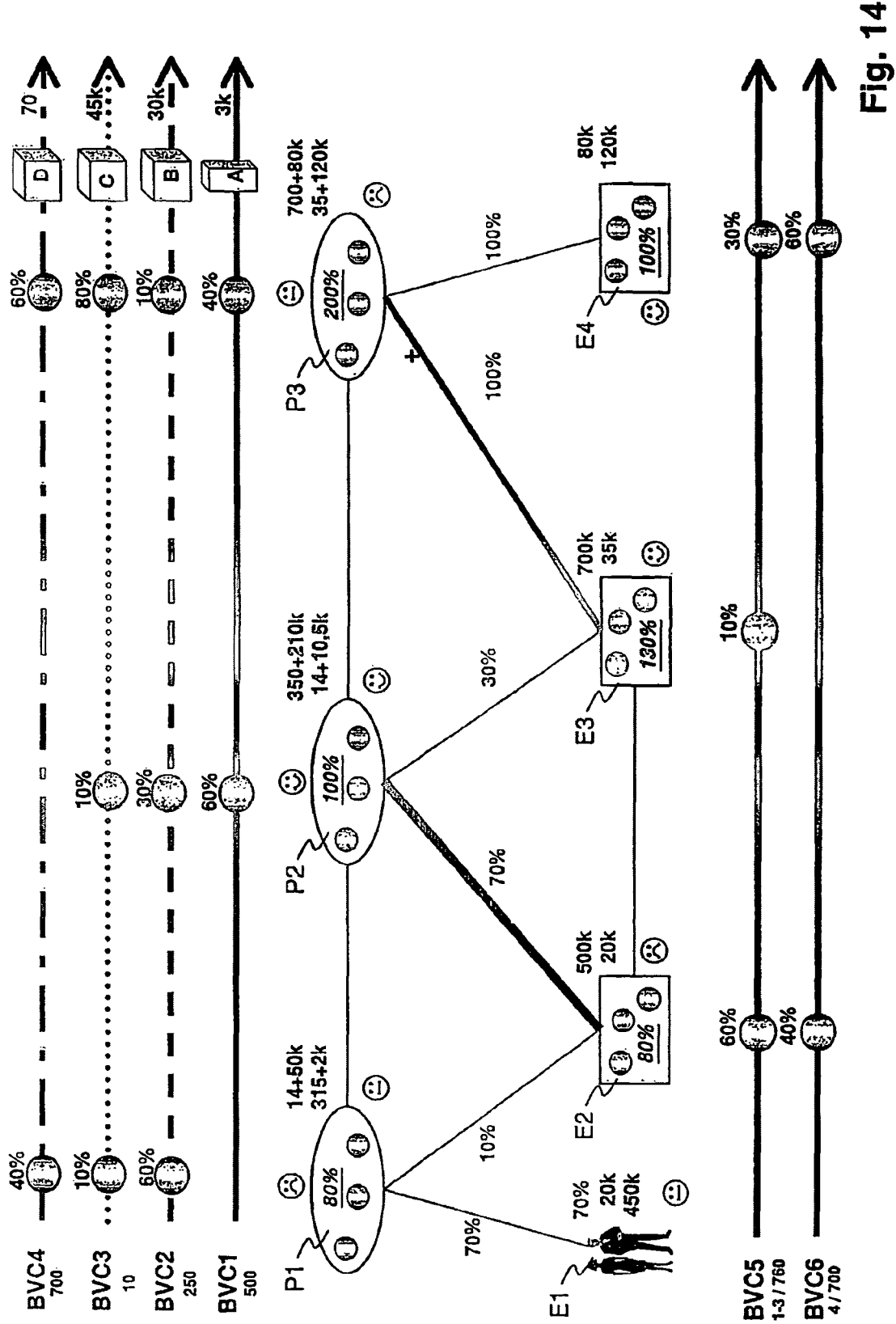
FIG. 14 support relations and cost distribution.

FIG. 14 shows various objects of a model which are in relation with one another, in a simplified manner. Event chains or use-cases BVC1-BVC4 on the process level run through processes P1-P3, wherein individual use-cases may also jump individual processes. On the element level, the event chain BVC5 corresponds to the event chains BVC1-BVC3, and the event chain BVC6 to the event chain BVC4. The processes P1-P3 are supported by elements E1-E4. These support relations are represented in FIG. 14 by lines. For example element E2 supports the processes P1 and P2. A degree of the support is expressed in the figure by percentage numbers. Thus the line between P1 and P2 indicates that 10% of the requirement of process P1 is covered by element E2, and 10% of the output of E2 is consumed by E2. Requirement or output on the one hand are expressed by absolute values, for example in working hours, costs, piece numbers etc. On the other hand the values on observation of a process, of an element, or an event chain etc. relate to the respective total requirement of a process or to total capacity of the element etc. and are expressed by percentage numbers. Thus it becomes visible how many elements by proportion contribute to a process and conversely, how much the output of an element is distributed over several processes. In FIG. 14, for simplification of the representation, it is assumed that the percentage numbers with all processes P1-P3 and elements E1-E4 relate to the same value. Process P1 is not completely supported according to this analysis, processes P3 undergoes double the support than would actually be needed. Element E3 with 130% is overburdened and element E1 is only up to a capacity of 70%.

The costs of a use-case are computed from the percentage shares of the process costs. An element supports a process with a certain share of the element capacity, and the process is supported by the element up to a certain share of its total requirement. Total costs are computed from this. For example in BVC4, process P1 accounts for 40%, and P3 for 60% of the costs.

The total costs of a use-case are thus computed from the element costs via the process costs. If an element supports no process at all, as for example E1, then its costs are distributed over the use-cases. Total costs for a use-case may be compared to an achieved price from the sale of the corresponding product A, B, C, D.

E2 accounts for 40% and E5 accounts for 60% of the costs of the same use-case, but on the element level, thus BVC6.

Although element E1 contributes to the process P1 by 70%, it supports no process on the element level.

In the case that the sum of the use-cases requires less than one hundred percent of a process, a value of the performance of the process obtains a reduced value as an expression of an insufficient performance.

Thus significant conclusions on process costs and their formation are made based on the explained manner of modelling and computation principles.

The procedure represented by way of the costs is preferably also used for other characteristics which may be represented as percentage dependencies between objects, for example risks.

A modelling of costs is often effected via various steps of an object hierarchy. For example, the object hierarchy describes a product and its composition of part products, or a hierarchically membered sortiment of structures. With the modelling or model parameterisation, the costs are acquired at various locations. The costs must be consistent and under certain circumstances permit missing information to be automatically evaluated.

FIG. 15 illustrates how one proceeds with this: a tree structure is given in which a parent node 20 comprises several child nodes 21 which are assigned to it, and each node 20, 21 is provided with an attribute. The attribute represents a certain resource requirement, for example costs, piece numbers, time, material requirement, etc., called "costs" in the following for simplicity. In FIGS. 15a and 15b, these costs are 620, 250, 300, 0 and "not defined", which is indicated by <nil>. The following different types of object relations with associated computation manners are used for the representation of interrelations and propagation: aggregation, inheritance and simple relation.

With aggregation 22, the sum of the costs of the parent nodes 20 and child nodes 21 (in FIG. 15a: 250, 300, 0, <nil>) is equal to the costs sum (620) assigned to the parent node 20. For the costs of the parent object alone (70) there remains the difference between this cost sum (620) and the sum of the costs of the child nodes (250+ 300). In FIGS. 15a and 15b, this interrelation is indicated by the reference numeral 22. This computation manner is for example useful for costs of products corresponding to parent nodes 20, and of components corresponing to child nodes 21.

With inheritance 23, a child node 21, if its costs are undefined, receives the costs of the parent node 20 (620). The costs sum (1790) is equal to the sum of the costs of the parent object and the costs of all child nodes. This computation type is useful for example for costs of generalised products in a product catalogue, corresponding to parent nodes 20, and specific products, corresponing to child nodes 21.

With the simple relation 24, the costs remain unchanged, undefined costs are observed as zero. The cost sum (1170) is equal to the sum of the costs of the parent object and the costs of all child nodes.

With a given capacity of for example 620, with the aggregation 22 there results an agreement with the costs, and with the other two computation types 23, 24 an under-funding to a greater or lesser extent. FIG. 15b shows the same computation mechanism as in FIG. 15a, but with the costs of the parent nodes 20 of 0 instead of 620.

Performance Assessment

Characteristic values of objects in operation of the real system are determined by way of the model tracked to the system by way of measurement variables. Demands of such characteristic values which for example represent outputs, piece numbers, money amounts, product quality, machine utilisation etc. are summarised in a strategy object. This is effected in a hierarchical form: demands on parameters are indicated as goals and summarised, are indicated as "assumptions". Within a assumption these goals are weighted by percentage, i.e. their weightings result to 100%. Assumptions to the same extent may be summarised weighted to assumptions on a higher stage. A summary of all assumptions is indicated as a strategy on the uppermost step. The goals of a assumption are defined, qualified, quantified, are in a sequence, are priorised and may be in relation to one another. The individual setting of goals or assumptions may be linked to other pre-defined objects by way of an interactive relation. This linking may be set up into an external representative, process, element, a working means, a requirement. etc. With these links one for example defines to how much percent an object is affected by this strategy or assumption, as well as to how much percent an assumption is dependent on, or covered by the object. These links may be used for dependence analyses.

In a preferred variant of the invention with which the model is tracked by way of measurements on the real system, an accomplishment degree of the various goals is computed. By way of the hierarchy of the assumptions and by way of the weightings, one computes the accomplishment of the assumptions and the strategy. With this, a value is constantly present which gives information on the performance or the current condition of the system with respect to goal achievement. When required, by way of navigation through assumption objects and their dependency relations, one may interactively ascertain who or what contributes to goal achievement and to what extent Model Comparison For comparing a system at different points in time or in different conditions, mostly two models of the system are present according to the different conditions, also called observation rooms. Depending on the context, such conditions are called the actual condition and the nominal condition. For example a nominal condition corresponds to a desired system or reference condition after the introduction of new operations software, after reorganisation of structures and sequences, or after installation of a new machine. Differences between the models on the one hand lie in the model structure, thus the structure of relations between the objects, and on the other hand in values of parameters or attributes of objects which are assigned to one another.

On account of the continuous modelling on the basis of the basic types, a comparison of different models may finally be led back to a comparison of a structure of the basic types. The comparison may be implemented more efficiently by way of this, than with the use of several different modelling paradigms for different model aspects.

In order to convey one condition into another condition, one requires a quantity of actions or changes of the system or of the model mostly distributed over a certain time range. This quantity of actions is called project portfolio and comprises several sub-quantities, called project. The project portfolio preferably itself is represented as an individual model in which the changes between the observed two models for checking are prepared by way of assuming or rejecting. The determining of the actions is effected by comparison of an object hierarchy of the objects instanced in the model with so-called compare & merge algorithms.

FIG. 16 schematically shows such a model comparison. In each case a first and second model part for describing a process model 13, and element model 14 and a model of an information and function level 15 are compared to one another. The comparison results in a setting-up of changes of the respective observation levels. The corresponding actions are summarised in projects 18, 19 in the project portfolio 17.

Process Control

The already mentioned sensors for data acquisition are installed at defined locations in the system for system monitoring and system control. These information collectors as a rule function in an automatic manner, but may also be based on manual user inputs. Evaluated readings of the sensors in the model are computed in accordance with the processing defined in the model and combined with other data. The process is controlled with the values which are calculated afresh in such a manner. If certain values exceed predefined limit values, notifications and alarms are triggered. For example for this, an SMS, a document dispatch via e-mail, a transfer of information to a mobile apparatus or speech information via telephone is transmitted A pragmatic but complete basis for modelling, control and monitoring complex technical and organisatory systems and sequences is created by the invention. It permits:
- the constant provision of models for various targets with regard to the public in a consistent, transparent manner which is at the correct level, in particular to maximally support an automated or manual decision process,
- the provision of information of the quality, risks, costs, uses, feasibility, etc. at any time
- the maximal support of required analyses and the ability to always control changes in a current manner.

The invention claimed is:

1. A method for analysis of a computer-based and data-processing model of a complex system, wherein the model comprises at least two modelling levels, on which the complex system is represented with different degrees of abstraction, and the analysis method comprises the following steps:
creating a first part model of the complex system on a first modelling level by defining objects and links between these objects;
creating a second part model of the complex system on a second modelling level by defining of objects and links between these objects;
creating associations or relations between objects of the first and the second modelling level;
creating at least one first event chain which represents an action sequence in the first modelling level and describes the action sequence by way of the objects of the first modelling level, wherein the action sequence is a sequence of actions in the complex system;
creating at least one second event chain which represents the same action sequence in the complex system in the second modelling level and describes the action sequence by way of the objects of the second modelling level at a different degree of detail than at the first modelling level;
as well as at least one of the following two steps performed by a data processor:
automatically analysing the part models and associations and event chains set up according to the preceding steps, for determining and issuing quality information on the model itself, by determining consistency information concerning agreements and contradictions between the models on the two modelling levels,
automatically analysing the part models and associations and event chains created according to the preceding steps, for obtaining information on the modelled complex system and for issuing this information,
wherein the associations between the first and the second modelling level represent a partial support of the objects of the first modelling level by the objects of the second modelling level; and
wherein at least a few objects on the first modelling level represent processes, wherein a process is an entirety of tasks and sequences of an organisation unit or production unit, and wherein at least some objects on the second modelling level represent elements, wherein an element is a real physical or logical unit, and wherein the support of the process by an element expresses the fact that the process requires the element in order to be able to function.

2. The method according to claim 1, wherein the links represent an exchange or transfer of working means, wherein a working means represents a physical unit or an information unit.

3. The method according to claim 1, wherein at least a few objects on the first modelling level represent elements, wherein an element represents a real physical or logical unit, and wherein at least some objects on the second modelling level represent information and function units, wherein the information- and function units are data, programs or rules, and wherein the support of an element by an information- and function unit expresses the fact that the element requires the information- and function unit in order to be able to function.

4. The method according to claim 1, comprising the step of assigning a second interface between objects on the second modelling level to a first interface between objects on the first modelling level, and the step of, for forming consistency information, checking as to whether a working means which is transmitted via the first interface, and a working means which is transmitted via the second interface, correspond to one another.

5. The method according to claim 4, wherein several first interfaces are part of the first event chain, and several second interfaces are part of the second event chain, and in each case one of the first interfaces is assigned to one of the second interfaces.

6. The method according to claim 1, comprising the step of determining with the automatic analysis of the modelled system, at least one numerical support degree which represents whether and how much an object on the first modelling level is supported by an object on the second modelling level; wherein the support of a process by an element expresses the fact that the process requires the element in order to be able to function, or wherein the support of an element by an information- and function unit expresses the fact that the element requires the information- and function unit in order to be able to function.

7. The method according to claim 6, comprising the step of determining, by way of support degrees, whether a supported process is supported too little or excessively, and whether a supporting element is under-burdened or overburdened.

8. The method according to claim 6, comprising the step of determining, by way of support degrees and by way of costs of the elements, actual costs of processes and from this, costs of products.

9. The method according to claim 1, comprising the step of determining, with the automatic analysis of the modelled system, at least one numeric performance value which represents a degree of the accomplishment of predefined goals, wherein goals are assigned to the objects and the goals are grouped in a hierarchical manner and are weighted relative to one another.

10. The method according to claim 9, comprising the step of representing a graphic representation of the goals and their degree of accomplishment to a user.

11. The method according to claim 1, comprising the step of processing, with the automatic analysis of the modelled system, numerical values for describing risks by way of risk objects which in each case are assigned to one of the other model objects.

12. The method according to claim 11, comprising the step of a risk object, in the case that a risk exceeds a predefined threshold value, triggering a message to a user and/or a control command to the system.

13. The method according to claim 1, wherein in total three modelling levels are used and at least some of the objects on the third modelling level represent information and function units, wherein the information and function units are data, programs or rules, and wherein the support of an element by an information and function unit expresses the fact that the element requires the information and function unit in order to be able to function.

14. The method according to claim 1, comprising the step of using objects for representing products which are displaced between processes, between elements and/or along event chains.

15. The method according to claim 1, comprising the step of using data evaluated in the model for the control of the system, said system being a technical installation or a production process.

16. A data processing system for modelling a complex system, wherein the data processing system comprises a processor, a data storage means, and a computer program stored by the data storage means and executed by the processor; wherein execution of the computer program by the processor implements a method for analysis of a computer-based and data-processing model of a complex system, wherein the model comprises at least two modelling levels, on which the complex system is represented with different degrees of abstraction, and the analysis method comprises the following steps:
creating a first part model of the complex system on a first modelling level by defining objects and links between these objects;
creating a second part model of the complex system on a second modelling level by defining of objects and links between these objects;
creating associations or relations between objects of the first and the second modelling level;
wherein the associations between the first and the second modelling level represent a partial support of the objects of the first modelling level by the objects of the second modelling level; and
wherein at least a few objects on the first modelling level represent processes, wherein a process is an entirety of tasks and sequences of an organisation unit or production unit, and wherein at least some objects on the second modelling level represent elements, wherein an element is a real physical or logical unit, and wherein the support of the process by an element expresses the fact that the process requires the element in order to be able to function;
creating at least one first event chain which represents an action sequence in the first modelling level and describes the action sequence by way of the objects of the first modelling level, wherein the action sequence is a sequence of actions in the complex system;
creating at least one second event chain which represents the same action sequence in the complex system in the second modelling level and describes the action sequence by way of the objects of the second modelling level at a different degree of detail than at the first modelling level;
as well as at least one of the following two steps:
automatically analysing the part models and associations and event chains set up according to the preceding steps, for determining and issuing quality information on the model itself, by determining consistency information concerning agreements and contradictions between the models on the two modelling levels,
automatically analysing the part models and associations and event chains created according to the preceding steps, for obtaining information on the modelled complex system and for issuing this information.

17. The data processing system of claim 16, wherein the data processing system is implemented by a computer program for modelling a complex system, which may be loaded and implemented on data processing unit, and which on implementation carries out the complex system modelling.

18. A method for analysis of a computer-based and data-processing model of a complex system, wherein the model comprises at least two modelling levels, on which the complex system is represented with different degrees of abstraction, and the analysis method comprises the following steps:
creating a first part model of the complex system on a first modelling level by defining objects and links between these objects;
creating a second part model of the complex system on a second modelling level by defining of objects and links between these objects;
creating a third part model of the complex system on a third modelling level by defining of objects and links between these objects;
creating associations or relations between objects of the first and the second modelling level;
creating associations or relations between objects of the second and the third modelling level;
creating at least one first event chain which represents an action sequence in the first modelling level and describes the action sequence by way of the objects of the first modelling level, wherein the action sequence is a sequence of actions in the complex system;
creating at least one second event chain which represents the same action sequence in the complex system in the second modelling level and describes the action sequence by way of the objects of the second modelling level at a different degree of detail than at the first modelling level;
as well as at least one of the following two steps:
automatically analysing by a data processor the part models and associations and event chains set up according to the preceding steps, for determining and issuing quality information on the model itself, by determining consistency information concerning agreements and contradictions between the models on the two modelling levels, automatically analysing by a data processor the part models and associations and event chains created according to the preceding steps, for obtaining information on the modelled complex system and for issuing this information, wherein the links represent an exchange or transfer of working means, wherein a working means represents a physical unit or an information unit, wherein the associations between the first and the second modelling level represent a support of the objects of the first modelling level by the objects of the second modelling level, wherein at least a few objects on the first modelling level represent processes, wherein a process is an entirety of tasks and sequences of an organisation unit or production unit, and wherein at least some objects on the second modelling level represent elements, wherein an element is a real physical or logical unit, wherein the support of the process by an element expresses the fact that the process requires the element in order to be able to function, and wherein the associations between the second and the third modelling level represent a support of the objects of the second modelling level by the objects of the third modelling level, wherein at least some objects on the third modelling level represent information and function units, wherein the information- and function units are data, programs or rules, and wherein the support of an element by an information- and function unit expresses the fact that the element requires the information- and function unit in order to be able to function.

19. The method according to claim 18, comprising the step of determining with the automatic analysis of the modelled system, at least one numerical support degree which represents whether and how much an object on the first modelling level is supported by an object on the second modelling level.

20. A method for analysis of a computer-based and data-processing model of a complex system, wherein the model comprises at least two modelling levels, on which the complex system is represented with different degrees of abstraction, and the analysis method comprises the following steps:

creating a first part model of the complex system on a first modelling level by defining objects and links between these objects;

creating a second part model of the complex system on a second modelling level by defining of objects and links between these objects;

creating associations or relations between objects of the first and the second modelling level;

wherein the associations between the first and the second modelling level represent a partial support of the objects of the first modelling level by the objects of the second modelling level; and wherein at least a few objects on the first modelling level represent processes, wherein a process is an entirety of tasks and sequences of an organisation unit or production unit, and wherein at least some objects on the second modelling level represent elements, wherein an element is a real physical or logical unit, and wherein the support of the process by an element expresses the fact that the process requires the element in order to be able to function;

creating at least one first event chain which represents an action sequence in the first modelling level and describes the action sequence by way of the objects of the first modelling level, wherein the action sequence is a sequence of actions in the complex system;

creating at least one second event chain which represents the same action sequence in the complex system in the second modelling level and describes the action sequence by way of the objects of the second modelling level at a different degree of detail than at the first modelling level;

automatically analysing, by a data processor, the part models and associations and event chains set up according to the preceding steps, for determining and issuing quality information on the model itself; and comprising the further steps of:

determining, with the automatic determining of quality information on the model, consistency information concerning agreements and contradictions between the models on the two modelling levels, assigning several second interfaces between objects on the second modelling level to several first interfaces between objects on the first modelling level, wherein the first interfaces are part of the first event chain, and the second interfaces are part of the second event chain, and in each case one of the first interfaces is assigned to one of the second interfaces, and for forming consistency information, checking as to whether a working means which is transmitted via the first interface, and a working means which is transmitted via the second interface, correspond to one another.

21. A method for analysis of a computer-based and data-processing model of a complex system, wherein the model comprises at least two modelling levels, on which the complex system is represented with different degrees of abstraction, and the analysis method comprises the following steps:

creating a first part model of the complex system on a first modelling level by defining objects and links between these objects;

creating a second part model of the complex system on a second modelling level by defining of objects and links between these objects;

creating a third part model of the system on a third modelling level by defining of objects and links between these objects;

creating associations or relations between objects of the first and the second modelling level;

wherein the associations between the first and the second modelling level represent a partial support of the objects of the first modelling level by the objects of the second modelling level; and wherein at least a few objects on the first modelling level represent processes, wherein a process is an entirety of tasks and sequences of an organisation unit or production unit, and wherein at least some objects on the second modelling level represent elements, wherein an element is a real physical or logical unit, and wherein the support of the process by an element expresses the fact that the process requires the element in order to be able to function;

creating associations or relations between objects of the second and the third modelling level;

creating at least one first event chain which represents an action sequence in the first modelling level and describes the action sequence by way of the objects of the first modelling level, wherein the action sequence is a sequence of actions in the complex system;

creating at least one second event chain which represents the same action sequence in the complex system in the second modelling level and describes the action sequence by way of the objects of the second modelling level at a different degree of detail than at the first modelling level;

automatically analysing, by a data processor, the part models and associations and event chains created according to the preceding steps, for obtaining information on the modelled system and for issuing this information; and the method comprising the further steps of:

processing, with the automatic analysis of the modelled system, numerical values for describing risks by way of risk objects which in each case are assigned to one of the other model objects, and of a risk object, in the case that a risk exceeds a predefined threshold value, triggering a message to a user and/or a control command to the system.

22. A non-transitory computer-readable medium that stores instructions executable by one or more computer processors to perform a method for analysis of a computer-based and data-processing model of a complex system, wherein the model comprises at least two modelling levels, on which the complex system is represented with different degrees of abstraction, and the stored instructions comprise instructions for:

creating a first part model of the complex system on a first modelling level by defining objects and links between these objects;

creating a second part model of the complex system on a second modelling level by defining of objects and links between these objects;

creating associations or relations between objects of the first and the second modelling level;

wherein the associations between the first and the second modelling level represent a partial support of the objects of the first modelling level by the objects of the second modelling level; and wherein at least a few objects on the first modelling level represent processes, wherein a process is an entirety of tasks and sequences of an organisation unit or production unit, and wherein at least some objects on the second modelling level represent elements, wherein an element is a real physical or logical unit, and wherein the support of the process by an element expresses the fact that the process requires the element in order to be able to function;

creating at least one first event chain which represents an action sequence in the first modelling level and describes the action sequence by way of the objects of the first modelling level, wherein the action sequence is a sequence of actions in the complex system;

creating at least one second event chain which represents the same action sequence in the complex system in the second modelling level and describes the action sequence by way of the objects of the second modelling level at a different degree of detail than at the first modelling level;

as well as at least one of the following two steps:

automatically analysing the part models and associations and event chains set up according to the preceding steps, for determining and issuing quality information on the model itself, by determining consistency information concerning agreements and contradictions between the models on the two modelling levels, automatically analysing the part models and associations and event chains created according to the preceding steps, for obtaining information on the modelled complex system and for issuing this information.

* * * * *